United States Patent
Zuev et al.

(10) Patent No.: US 9,740,682 B2
(45) Date of Patent: Aug. 22, 2017

(54) SEMANTIC DISAMBIGUATION USING A STATISTICAL ANALYSIS

(71) Applicant: ABBYY InfoPoisk LLC, Moscow (RU)

(72) Inventors: Konstantin Alekseevich Zuev, Moscow (RU); Daria Nikolaevna Bogdanova, Moscow (RU)

(73) Assignee: ABBYY InfoPoisk LLC (RU)

( * ) Notice: Subject to any disclaimer, the term of this patent is extended or adjusted under 35 U.S.C. 154(b) by 124 days.

(21) Appl. No.: 14/509,355

(22) Filed: Oct. 8, 2014

(65) Prior Publication Data
US 2015/0178268 A1   Jun. 25, 2015

(30) Foreign Application Priority Data
Dec. 19, 2013  (RU) ................................ 2013156494

(51) Int. Cl.
| | | |
|---|---|---|
| *G06F 17/27* | (2006.01) | |
| *G10L 15/18* | (2013.01) | |
| *G06F 17/28* | (2006.01) | |
| *G06F 17/30* | (2006.01) | |

(52) U.S. Cl.
CPC ...... *G06F 17/2785* (2013.01); *G06F 17/2795* (2013.01); *G06F 17/2827* (2013.01); *G06F 17/30595* (2013.01); *G06F 17/30731* (2013.01); *G10L 15/1815* (2013.01); *G06F 17/30522* (2013.01); *G06F 17/30525* (2013.01); *G06F 17/30604* (2013.01); *G06F 17/30734* (2013.01); *G06F 17/30737* (2013.01)

(58) Field of Classification Search
None
See application file for complete search history.

(56) References Cited

U.S. PATENT DOCUMENTS

| | | | |
|---|---|---|---|
| 4,706,212 | A | 11/1987 | Toma |
| 5,068,789 | A | 11/1991 | Van Vliembergen |
| 5,128,865 | A | 7/1992 | Sadler |
| 5,146,405 | A | 9/1992 | Church |
| 5,175,684 | A | 12/1992 | Chong |

(Continued)

FOREIGN PATENT DOCUMENTS

| | | |
|---|---|---|
| EP | 2400400 A1 | 12/2001 |
| EP | 1365329 B1 | 10/2009 |
| WO | 2011160204 A1 | 12/2011 |

OTHER PUBLICATIONS

Bolshakov, "Co-Ordinative Ellipsis in Russian Texts: Problems of Description and Restoration", Published in: Proceeding COLING '88 Proceedings of the 12th conference on Computational linguistics—vol. 1 doi>10.3115/991635.991649, 1988, 65-67.

(Continued)

*Primary Examiner* — Richard Zhu
(74) *Attorney, Agent, or Firm* — Veronica Weinstein

(57) ABSTRACT

A text containing a word is received by a computing device. The word is compared to inventory words in a sense inventory. The sense inventory comprises at least one inventory word and at least one concept corresponding to the at least one inventory word. Upon matching the word to an inventory word in the sense inventory, a concept for the word is identified by comparing each concept related to the inventory word to the word. The concept is assigned the word.

20 Claims, 18 Drawing Sheets

(56) References Cited

U.S. PATENT DOCUMENTS

| | | |
|---|---|---|
| 5,268,839 A | 12/1993 | Kaji |
| 5,301,109 A | 4/1994 | Landauer et al. |
| 5,386,556 A | 1/1995 | Hedin et al. |
| 5,418,717 A | 5/1995 | Su et al. |
| 5,426,583 A | 6/1995 | Uribe-Echebarria Diaz De Mendibil |
| 5,475,587 A | 12/1995 | Anick et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,550,934 A | 8/1996 | Van Vliembergen et al. |
| 5,559,693 A | 9/1996 | Anick et al. |
| 5,669,007 A | 9/1997 | Tateishi |
| 5,677,835 A | 10/1997 | Carbonnell et al. |
| 5,678,051 A | 10/1997 | Aoyama |
| 5,687,383 A | 11/1997 | Nakayama et al. |
| 5,696,980 A | 12/1997 | Brew |
| 5,715,468 A | 2/1998 | Budzinski |
| 5,721,938 A | 2/1998 | Stuckey |
| 5,724,593 A | 3/1998 | Hargrave et al. |
| 5,729,741 A | 3/1998 | Liaguno et al. |
| 5,737,617 A | 4/1998 | Bernth et al. |
| 5,752,051 A | 5/1998 | Cohen |
| 5,768,603 A | 6/1998 | Brown et al. |
| 5,784,489 A | 7/1998 | Van Vliembergen et al. |
| 5,787,410 A | 7/1998 | McMahon |
| 5,794,050 A | 8/1998 | Dahlgren et al. |
| 5,794,177 A | 8/1998 | Carus et al. |
| 5,826,219 A | 10/1998 | Kutsumi |
| 5,826,220 A | 10/1998 | Takeda et al. |
| 5,848,385 A | 12/1998 | Poznanski et al. |
| 5,867,811 A | 2/1999 | O'Donoghue |
| 5,873,056 A | 2/1999 | Liddy et al. |
| 5,884,247 A | 3/1999 | Christy |
| 5,995,920 A | 11/1999 | Carbonell et al. |
| 6,006,221 A | 12/1999 | Liddy et al. |
| 6,055,528 A | 4/2000 | Evans |
| 6,076,051 A | 6/2000 | Messerly et al. |
| 6,081,774 A | 6/2000 | De Hita et al. |
| 6,161,083 A | 12/2000 | Franz et al. |
| 6,182,028 B1 | 1/2001 | Karaali et al. |
| 6,223,150 B1 | 4/2001 | Duan et al. |
| 6,233,544 B1 | 5/2001 | Alshawi |
| 6,233,546 B1 | 5/2001 | Datig |
| 6,243,669 B1 | 6/2001 | Horiguchi et al. |
| 6,243,670 B1 | 6/2001 | Bessho et al. |
| 6,243,689 B1 | 6/2001 | Norton |
| 6,243,723 B1 | 6/2001 | Ikeda et al. |
| 6,246,977 B1 | 6/2001 | Messerly et al. |
| 6,260,008 B1 | 7/2001 | Sanfilippo |
| 6,266,642 B1 | 7/2001 | Franz et al. |
| 6,275,789 B1 | 8/2001 | Moser et al. |
| 6,278,967 B1 | 8/2001 | Akers et al. |
| 6,282,507 B1 | 8/2001 | Horiguchi et al. |
| 6,285,978 B1 | 9/2001 | Bernth et al. |
| 6,330,530 B1 | 12/2001 | Horiguchi et al. |
| 6,345,245 B1 | 2/2002 | Sugiyama et al. |
| 6,349,276 B1 | 2/2002 | McCarley et al. |
| 6,356,864 B1 | 3/2002 | Foltz et al. |
| 6,356,865 B1 | 3/2002 | Franz et al. |
| 6,381,598 B1 | 4/2002 | Williamowski et al. |
| 6,393,389 B1 | 5/2002 | Chanod et al. |
| 6,442,524 B1 | 8/2002 | Ecker et al. |
| 6,463,404 B1 | 10/2002 | Appleby |
| 6,470,306 B1 | 10/2002 | Pringle et al. |
| 6,523,026 B1 | 2/2003 | Gillis |
| 6,529,865 B1 | 3/2003 | Duan et al. |
| 6,601,026 B2 | 7/2003 | Appelt et al. |
| 6,604,101 B1 | 8/2003 | Chan et al. |
| 6,622,123 B1 | 9/2003 | Chanod et al. |
| 6,658,627 B1 | 12/2003 | Gallup et al. |
| 6,721,697 B1 | 4/2004 | Duan et al. |
| 6,760,695 B1 | 7/2004 | Kuno et al. |
| 6,778,949 B2 | 8/2004 | Duan et al. |
| 6,871,174 B1 | 3/2005 | Dolan et al. |
| 6,871,199 B1 | 3/2005 | Binnig et al. |
| 6,901,399 B1 | 5/2005 | Corston et al. |
| 6,901,402 B1 | 5/2005 | Corston-Oliver et al. |
| 6,928,407 B2 | 8/2005 | Ponceleon et al. |
| 6,928,448 B1 | 8/2005 | Franz et al. |
| 6,937,974 B1 | 8/2005 | D'Agostini |
| 6,947,923 B2 | 9/2005 | Cha et al. |
| 6,965,857 B1 | 11/2005 | Decary |
| 6,983,240 B2 | 1/2006 | Ait-Mokhtar et al. |
| 6,986,104 B2 | 1/2006 | Green et al. |
| 7,013,264 B2 | 3/2006 | Dolan et al. |
| 7,020,601 B1 | 3/2006 | Hummel et al. |
| 7,027,974 B1 | 4/2006 | Busch et al. |
| 7,050,964 B2 | 5/2006 | Menzes et al. |
| 7,085,708 B2 | 8/2006 | Manson et al. |
| 7,132,445 B2 | 11/2006 | Taveras et al. |
| 7,146,358 B1 | 12/2006 | Gravano et al. |
| 7,167,824 B2 | 1/2007 | Kallulli |
| 7,191,115 B2 | 3/2007 | Moore |
| 7,200,550 B2 | 4/2007 | Menezes et al. |
| 7,263,488 B2 | 8/2007 | Chu et al. |
| 7,269,594 B2 | 9/2007 | Corston-Oliver et al. |
| 7,346,493 B2 | 3/2008 | Ringger et al. |
| 7,356,457 B2 | 4/2008 | Pinkham et al. |
| 7,409,404 B2 | 8/2008 | Gates |
| 7,461,056 B2 | 12/2008 | Cao et al. |
| 7,466,334 B1 | 12/2008 | Baba |
| 7,475,015 B2 | 1/2009 | Epstein et al. |
| 7,619,656 B2 | 11/2009 | Ben-Ezra et al. |
| 7,672,830 B2 | 3/2010 | Goutte et al. |
| 7,672,831 B2 | 3/2010 | Todhunter et al. |
| 7,739,102 B2 | 6/2010 | Bender |
| 8,078,450 B2 * | 12/2011 | Anisimovich ...... G06F 17/2755 704/2 |
| 8,122,016 B1 * | 2/2012 | Lamba ............. G06F 17/30976 707/723 |
| 8,145,473 B2 | 3/2012 | Anisimovich et al. |
| 8,195,447 B2 * | 6/2012 | Anismovich ........... G06F 17/28 704/2 |
| 8,214,199 B2 | 7/2012 | Anismovich et al. |
| 8,229,730 B2 | 7/2012 | Van Den Berg et al. |
| 8,229,944 B2 | 7/2012 | Latzina et al. |
| 8,260,049 B2 | 9/2012 | Deryagin et al. |
| 8,266,077 B2 | 9/2012 | Handley |
| 8,271,453 B1 | 9/2012 | Pasca et al. |
| 8,285,728 B1 | 10/2012 | Rubin |
| 8,300,949 B2 | 10/2012 | Xu |
| 8,301,633 B2 | 10/2012 | Cheslow |
| 8,402,036 B2 | 3/2013 | Blair-Goldensohn et al. |
| 8,533,188 B2 | 9/2013 | Yan et al. |
| 8,548,951 B2 | 10/2013 | Solmer et al. |
| 8,554,558 B2 | 10/2013 | Mccarley et al. |
| 8,577,907 B1 | 11/2013 | Singhal et al. |
| 8,856,096 B2 | 10/2014 | Marchisio et al. |
| 2001/0014902 A1 | 8/2001 | Hu et al. |
| 2001/0029442 A1 | 10/2001 | Shiotsu et al. |
| 2001/0029455 A1 | 10/2001 | Chin et al. |
| 2002/0040292 A1 | 4/2002 | Marcu |
| 2003/0145285 A1 | 7/2003 | Miyahira et al. |
| 2003/0158723 A1 | 8/2003 | Masuichi et al. |
| 2003/0176999 A1 | 9/2003 | Calcagno et al. |
| 2003/0182102 A1 | 9/2003 | Corston-Oliver et al. |
| 2003/0204392 A1 | 10/2003 | Finnigan et al. |
| 2004/0034520 A1 | 2/2004 | Langkilde-Geary et al. |
| 2004/0064438 A1 | 4/2004 | Kostoff |
| 2004/0098247 A1 | 5/2004 | Moore |
| 2004/0122656 A1 | 6/2004 | Abir |
| 2004/0172235 A1 | 9/2004 | Pinkham et al. |
| 2004/0193401 A1 | 9/2004 | Ringger et al. |
| 2004/0243581 A1 * | 12/2004 | Weissman ......... G06F 17/30616 |
| 2004/0254781 A1 | 12/2004 | Appleby |
| 2004/0261016 A1 | 12/2004 | Glass et al. |
| 2005/0010421 A1 | 1/2005 | Watanabe et al. |
| 2005/0015240 A1 | 1/2005 | Appleby |
| 2005/0080613 A1 | 4/2005 | Colledge et al. |
| 2005/0086047 A1 | 4/2005 | Uchimoto et al. |
| 2005/0137853 A1 | 6/2005 | Appleby et al. |
| 2005/0155017 A1 | 7/2005 | Berstis et al. |

(56) References Cited

U.S. PATENT DOCUMENTS

| | | |
|---|---|---|
| 2005/0171757 A1 | 8/2005 | Appleby |
| 2005/0209844 A1 | 9/2005 | Wu et al. |
| 2005/0228641 A1* | 10/2005 | Chelba .................. G06F 17/27 704/9 |
| 2005/0240392 A1 | 10/2005 | Munro, Jr. et al. |
| 2006/0004563 A1 | 1/2006 | Campbell et al. |
| 2006/0004653 A1 | 1/2006 | Strongin |
| 2006/0080079 A1 | 4/2006 | Yamabana |
| 2006/0095250 A1 | 5/2006 | Chen et al. |
| 2006/0217963 A1* | 9/2006 | Masuichi ............ G06F 17/2836 704/7 |
| 2006/0217964 A1 | 9/2006 | Kamatani et al. |
| 2006/0224378 A1 | 10/2006 | Chino et al. |
| 2006/0293876 A1 | 12/2006 | Kamatani et al. |
| 2007/0010990 A1 | 1/2007 | Woo |
| 2007/0016398 A1 | 1/2007 | Buchholz |
| 2007/0083359 A1 | 4/2007 | Bender |
| 2007/0083505 A1 | 4/2007 | Ferrari et al. |
| 2007/0094006 A1 | 4/2007 | Todhunter et al. |
| 2007/0100601 A1 | 5/2007 | Kimura |
| 2007/0203688 A1 | 8/2007 | Fuji et al. |
| 2007/0250305 A1 | 10/2007 | Maxwell |
| 2008/0040095 A1* | 2/2008 | Sinha .................. G06F 17/2872 704/2 |
| 2008/0059149 A1* | 3/2008 | Martin ................ G06F 17/2785 704/9 |
| 2008/0133218 A1 | 6/2008 | Zhou et al. |
| 2008/0228464 A1 | 9/2008 | Al-Onaizan et al. |
| 2008/0319947 A1 | 12/2008 | Latzina et al. |
| 2009/0063472 A1 | 3/2009 | Pell et al. |
| 2009/0070094 A1 | 3/2009 | Best et al. |
| 2009/0182549 A1* | 7/2009 | Anisimovich ...... G06F 17/2755 704/4 |
| 2010/0082324 A1 | 4/2010 | Itagaki et al. |
| 2011/0055188 A1 | 3/2011 | Gras |
| 2011/0072021 A1 | 3/2011 | Lu et al. |
| 2011/0238409 A1* | 9/2011 | Larcheveque ...... G06F 17/2785 704/9 |
| 2011/0258181 A1 | 10/2011 | Brdiczka et al. |
| 2011/0301941 A1 | 12/2011 | De Vocht |
| 2012/0023104 A1 | 1/2012 | Johnson et al. |
| 2012/0030226 A1 | 2/2012 | Holt et al. |
| 2012/0109640 A1* | 5/2012 | Anisimovich ...... G06F 17/2755 704/9 |
| 2012/0131060 A1 | 5/2012 | Heidasch et al. |
| 2012/0197628 A1 | 8/2012 | Best et al. |
| 2012/0197885 A1 | 8/2012 | Patterson |
| 2012/0203777 A1 | 8/2012 | Laroco, Jr. et al. |
| 2012/0221553 A1 | 8/2012 | Wittmer et al. |
| 2012/0239378 A1* | 9/2012 | Parfentieva ......... G06F 17/2881 704/4 |
| 2012/0246153 A1 | 9/2012 | Pehle |
| 2012/0296897 A1 | 11/2012 | Xin-Jing et al. |
| 2012/0310627 A1 | 12/2012 | Qi et al. |
| 2013/0013291 A1 | 1/2013 | Bullock et al. |
| 2013/0054589 A1 | 2/2013 | Cheslow |
| 2013/0091113 A1 | 4/2013 | Gras |
| 2013/0138696 A1 | 5/2013 | Turdakov et al. |
| 2013/0144592 A1 | 6/2013 | Och et al. |
| 2013/0144594 A1 | 6/2013 | Bangalore et al. |
| 2013/0185307 A1 | 7/2013 | El-Yaniv et al. |
| 2013/0254209 A1 | 9/2013 | Kang et al. |
| 2013/0282703 A1 | 10/2013 | Puterman-Sobe et al. |
| 2013/0311487 A1 | 11/2013 | Moore et al. |
| 2013/0318095 A1 | 11/2013 | Harold |
| 2014/0012842 A1 | 1/2014 | Yan et al. |

OTHER PUBLICATIONS

Hutchins, "Machine Translation: past, present, future", (Ellis Horwood Series in Computers and their Applications) Ellis Horwood: Chichester, 1986, 382 pp. ISBN 0-85312-788-3, $49.95 (hb).

Mitamura, et al., "An Efficient Interlingua Translation System for Multi-Lingual Document Production", http:// citeseerx.ist.psu.edu/viewdoc/summary?doi=10.1.1.44.5702, Jul. 1, 1991.

Yamashita, et al., "Word Sense Disambiguation Using Pairwise Alignment", Faculty of Administration and Informatics, University of Hamamatsu, 2003, 4 pages.

Tou Ng et al., "Exploiting Parallel Texts for Word Sense Disambiguation: An Empirical Study", Department of Computer Science, National University of Singapore, Singapore, 2003, 8 pages.

Seng Chan et al., "Scaling Up Word Sense Disambiguation via Parallel Texts", Department of Computer Science, National University of Singapore, Singapore, 2005, 6 pages.

Ion et al., "Multilingual Word Sense Disambiguation Using Aligned Wordnets", Romanian Journal of Information Science and Technology, vol. 7, Nos. 1-2, 2004, pp. 183-200, 18 pages, Research Institute for Artificial Intelligence, Romanian Academy.

Tufis et al., "Fine-Grained Word Sense Disambiguation Based on parallel Corpora, Word Alignment, Word Clustering and Aligned Wordnets", Institute of Artificial Intelligence, Romania and Department of Computer Science, Poughkeepsie, New York, Sep. 13, 2004, 7 pages.

* cited by examiner

SEMANTIC DISAMBIGUATION USING A STATISTICAL ANALYSIS

CROSS REFERENCE TO RELATED APPLICATIONS

This application also claims the benefit of priority under 35 USC 119 to Russian Patent Application No. 2013156494, filed Dec. 19, 2013; the disclosure of the priority application is incorporated herein by reference.

BACKGROUND

There are a lot of ambiguous words in many languages, i.e., words that have several meanings. When a human finds such word in text he/she can unmistakably select the proper meaning depending on context and intuition. Another situation is when a text is analyzed by a computer system. Existing systems for text disambiguation are mostly based on lexical resources, such as dictionaries. Given a word, such methods extract from the lexical resource all possible meanings of this word. Then various methods may be applied to find out which of these meanings of the word is the correct one. The majority of these methods are statistical, i.e. based on analyzing large text corpora, while some are based on the dictionary information (e.g., counting overlaps between dictionary gloss and word's local context). Given a word which is to be disambiguated, such methods usually solve a classification problem (i.e., possible meanings of the word are considered as categories, and the word has to be classified into one of them).

Existing methods address the problem of disambiguation of polysemous words and homonyms, the methods consider as polysemous and homonyms those words that appear several times in the used sense inventory. Neither of the methods deals with words that do not appear at all in the used lexical resource. Sense inventories used by existing methods do not allow changes and do not reflect the changes going on in the language. Only a few methods are based on Wikipedia but the methods themselves do not make any changes in the sense inventory and those.

Nowadays, the world changes rapidly, many new technologies and products appear, and the language changes respectively. New words to denote new concepts appear as well as new meaning of some existing words. Therefore, methods for text disambiguation should be able to deal efficiently with new words that are not covered by used sense inventory, to add these concepts to the sense inventory and thus, use them during further analysis.

SUMMARY

An exemplary embodiment relates to method. The method includes, but is not limited to any of the combination of: receiving text by a computing device, the text including a word; comparing, by a processor of the computing device, the word in the text to inventory words in a sense inventory, wherein the sense inventory comprises at least one inventory word and at least one concept corresponding to the at least one inventory word; responsive to matching the word to an inventory word in the sense inventory, identifying a concept for the word by comparing each concept related to the inventory word to the word; responsive to identifying the concept that is correct for the word, assigning the concept to the word; and responsive to not identifying the concept that is correct for the word, adding a new concept to the sense inventory for the inventory word.

Another exemplary embodiment relates to a system. The system includes one or more data processors. The system further includes one or more storage devices storing instructions that, when executed by the one or more data processors, cause the one or more data processors to perform operations comprising: receiving text by a computing device, the text including a word; comparing, by a processor of the computing device, the word in the text to inventory words in a sense inventory, wherein the sense inventory comprises at least one inventory word and at least one concept corresponding to the at least one inventory word; responsive to matching the word to an inventory word in the sense inventory, identifying a concept for the word by comparing each concept related to the inventory word to the word; responsive to identifying the concept that is correct for the word, assigning the concept to the word; and responsive to not identifying the concept that is correct for the word, adding a new concept to the sense inventory for the inventory word.

Yet another exemplary embodiment relates to computer readable storage medium having machine instructions stored therein, the instructions being executable by a processor to cause the processor to perform operations comprising: receiving text by a computing device, the text including a word; comparing, by a processor of the computing device, the word in the text to inventory words in a sense inventory, wherein the sense inventory comprises at least one inventory word and at least one concept corresponding to the at least one inventory word; responsive to matching the word to an inventory word in the sense inventory, identifying a concept for the word by comparing each concept related to the inventory word to the word; responsive to identifying the concept that is correct for the word, assigning the concept to the word; and responsive to not identifying the concept that is correct for the word, adding a new concept to the sense inventory for the inventory word.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

In the following description, for purposes of explanation, numerous specific details are set forth in order to provide a thorough understanding concepts underlying the described embodiments. It will be apparent, however, to one skilled in the art that the described embodiments can be practiced without some or all of these specific details. In other instances, structures and devices are shown only in block diagram form in order to avoid obscuring the described embodiments. Some process steps have not been described in detail in order to avoid unnecessarily obscuring the underlying concept.

According to various embodiments disclosed herein, a method and a system for semantic disambiguation of text based on sense inventory with hierarchical structure or semantic hierarchy and method of adding concepts to semantic hierarchy are provided. The semantic classes, as part of linguistic descriptions, are arranged into a semantic hierarchy comprising hierarchical parent-child relationships. In general, a child semantic class inherits many or most properties of its direct parent and all ancestral semantic classes. For example, semantic class SUBSTANCE is a child of semantic class ENTITY and at the same time it is a parent of semantic classes GAS, LIQUID, METAL, WOOD_MATERIAL, etc.

Each semantic class in the semantic hierarchy is supplied with a deep model. The deep model of the semantic class is a set of deep slots. Deep slots reflect the semantic roles of child constituents in various sentences with objects of the semantic class as the core of a parent constituent and the possible semantic classes as fillers of deep slots. The deep slots express semantic relationships between constituents, including, for example, "agent", "addressee", "instrument", "quantity", etc. A child semantic class inherits and adjusts the deep model of its direct parent semantic class.

At least some of the embodiments utilize exhaustive text analysis technology, which uses wide variety of linguistic descriptions described in U.S. Pat. No. 8,078,450. The analysis includes lexico-morphological, syntactic and semantic analysis, as a result language-independent semantic structures, where each word is mapped to the corresponding semantic class, is constructed.

Figure 1:
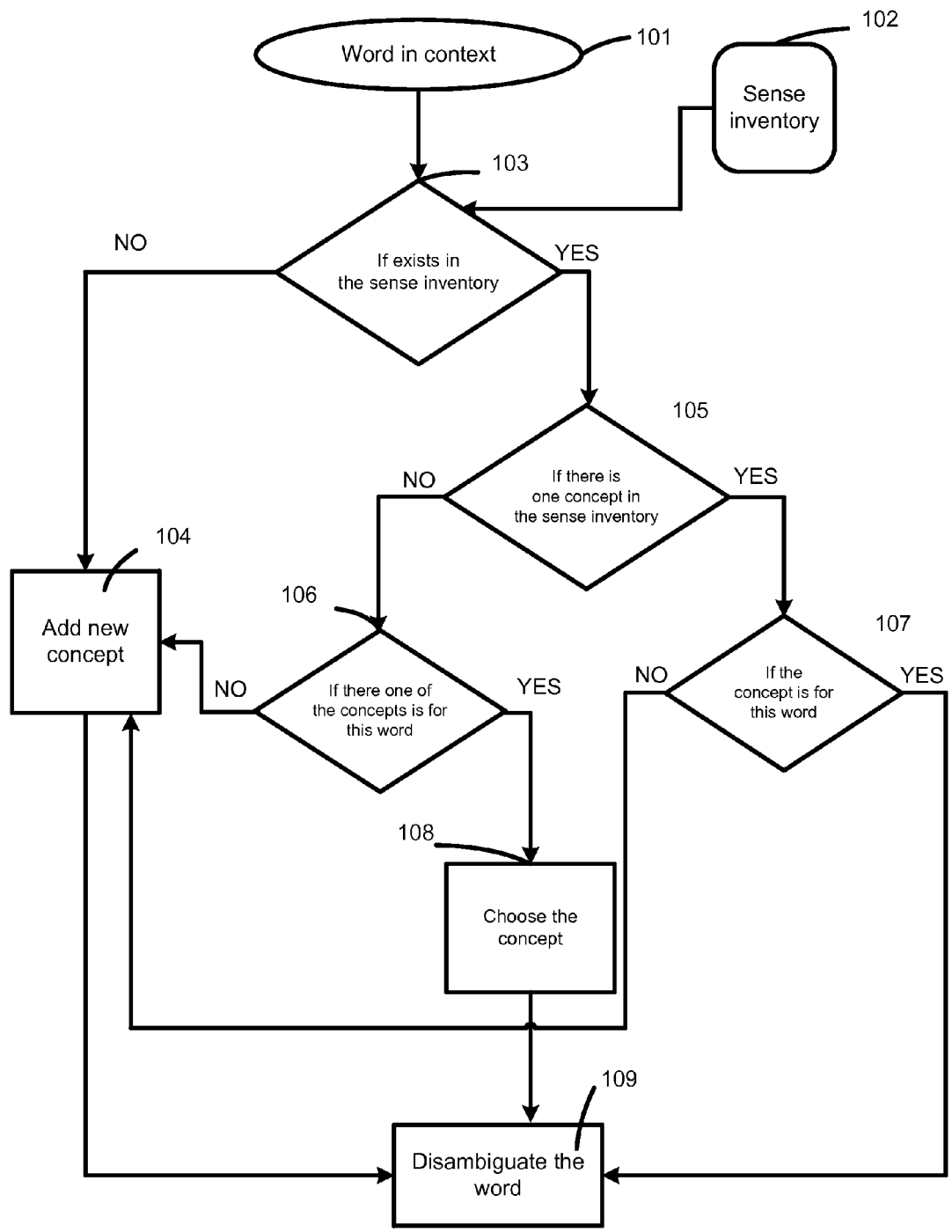
FIG. 1 is a flow diagram of a method of semantic disambiguation according to one or more embodiments.

FIG. 1 is a flow diagram of a method of semantic disambiguation of a text according to one or more embodiments. Given a text and a sense inventory 102 with hierarchical structure, for each word 101 in the text, the method performs the following steps. If the word appears only once in the sense inventory (105), the method checks (107) if this occurrence is an instance of this word meaning. This may be done with one of existing statistical methods: if the word's context is similar to the contexts of the words in this meaning in corpora, and if the contexts are similar, the word in the text is assigned (109) to the corresponding concept of the inventory. If the word is not found to be an instance of this object of the sense inventory, new concept is inserted (104) in the sense inventory and the word is associated with this new concept. The parent object of the concept to be inserted may be identified by statistically analyzing each level of the hierarchy starting from the root and in each step choosing the most probable node. The probability of each node to be associated with the word is based on text corpora.

If the word appears two or more times in the sense inventory, the method decides (106) which of the concepts, if any, is the correct one for the word 101. This may be done by applying any existing word concept disambiguation method. If one of the concepts is found to be correct for the word, the word is identified with the corresponding concept of the sense inventory 108. Otherwise, new concept is added to the sense inventory 104. The parent object of the concept to be inserted may be identified by statistically analyzing each level of the hierarchy starting from the root and in each step choosing the most probable node. The probability of each node is based on text corpora.

If the word does not appear at all in the sense inventory, the corresponding sense is inserted in the sense inventory 104. The parent object of the concept to be inserted may be identified by statistically analyzing each level of the hierarchy starting from the root and in each step choosing the most probable node. The probability of each node is based on text corpora. In another embodiment, the method may disambiguate only one word or a few words in context, while other words are treated only as context and do not need to be disambiguated.

Figure 2:
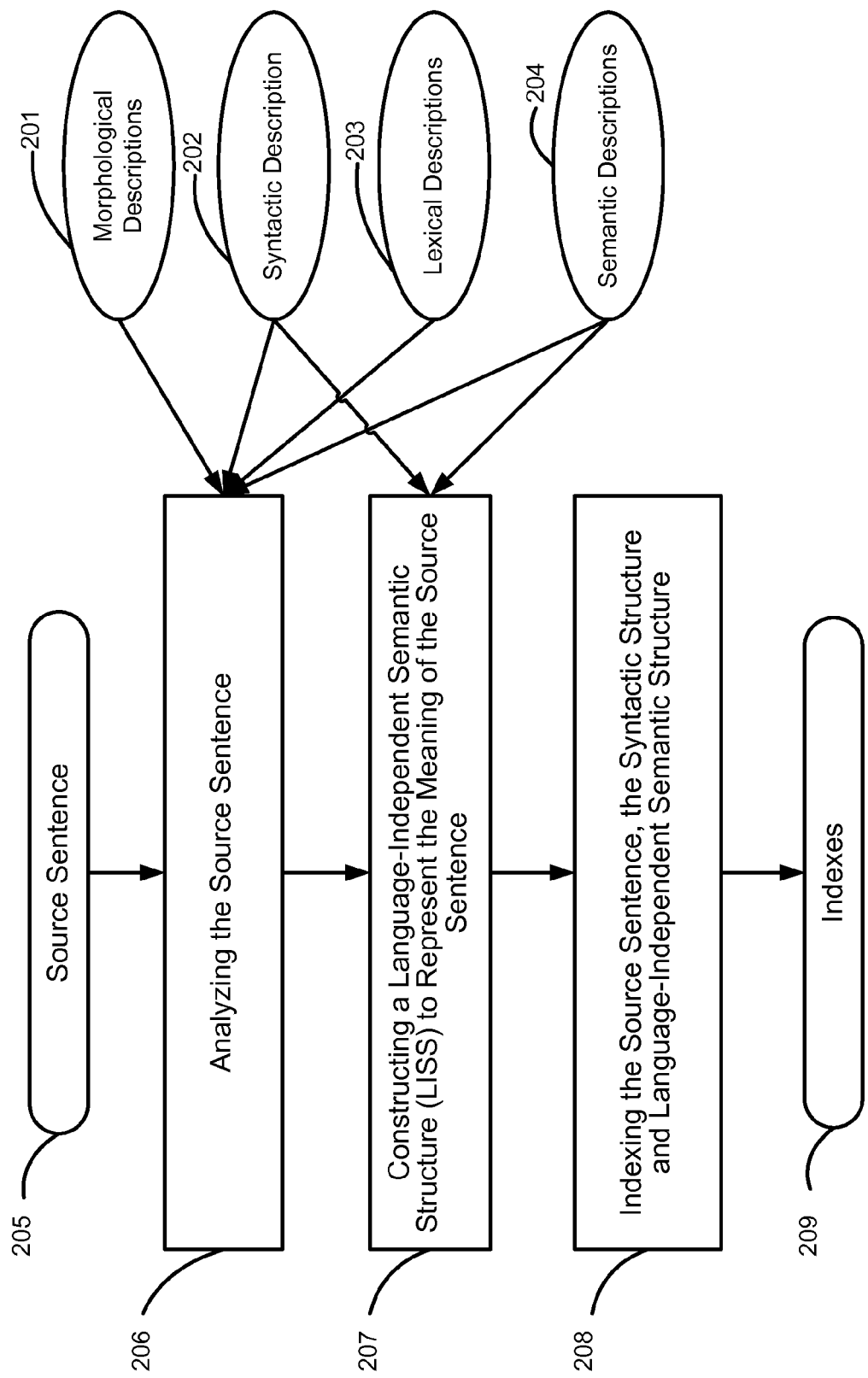
FIG. 2 is a flow diagram of a method of exhaustive analysis according to one or more embodiments.

In one embodiment, the exhaustive analysis techniques may be utilized. FIG. 2 is a flow diagram of a method of exhaustive analysis according to one or more embodiments. With reference to FIG. 2, linguistic descriptions may include lexical descriptions 203, morphological descriptions 201, syntactic descriptions 202, and semantic descriptions 204. Each of these components of linguistic descriptions are shown influencing or serving as input to steps in the flow diagram 200. The method includes starting from a source sentence 205. The source sentence is analyzed (206) as discussed in more detail with respect to FIG. 3. Next, a language-independent semantic structure (LISS) is constructed (207). The LISS represents the meaning of the source sentence. Next, the source sentence, the syntactic structure of the source sentence and the LISS are indexed (208). The result is a set of collection of indexes or indices 209.

An index may comprise and may be represented as a table where each value of a feature (for example, a word, expression, or phrase) in a document is accompanied by a list of numbers or addresses of its occurrence in that document. In some embodiments, morphological, syntactic, lexical, and semantic features can be indexed in the same fashion as each word in a document is indexed. In one embodiment, indexes may be produced to index all or at least one value of morphological, syntactic, lexical, and semantic features (parameters). These parameters or values are generated during a two-stage semantic analysis described in more detail below. The index may be used to facilitate such operations of natural language processing such as disambiguating words in documents.

Figure 3:
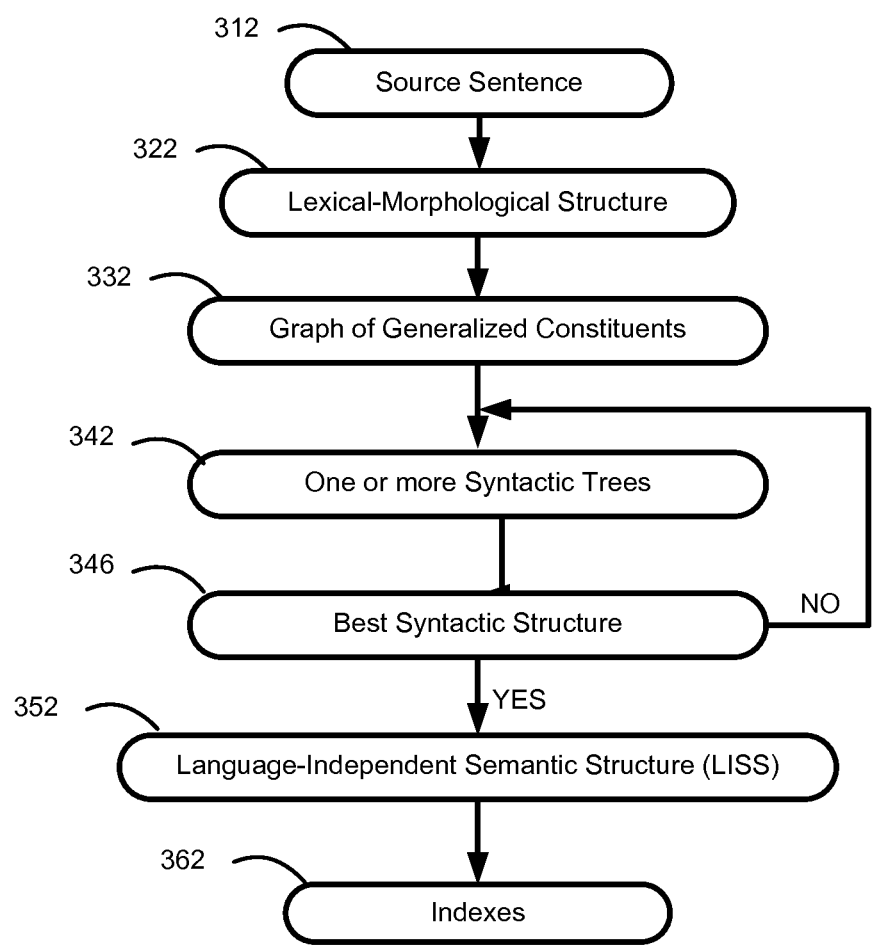
FIG. 3 shows a flow diagram of the analysis of a sentence according to one or more embodiments.

FIG. 3 shows a flow diagram of the analysis of a sentence according to one or more embodiments. With reference to FIG. 2 and FIG. 3, when analyzing (206) the meaning of the source sentence 205, a lexical-morphological structure is found 322. Next, a syntactic analysis is performed and is realized in a two-step analysis algorithm (e.g., a "rough" syntactic analysis and a "precise" syntactic analysis) implemented to make use of linguistic models and knowledge at various levels, to calculate probability ratings and to generate the most probable syntactic structure, e.g., a best syntactic structure.

Accordingly, a rough syntactic analysis is performed on the source sentence to generate a graph of generalized constituents 332 for further syntactic analysis. All reasonably possible surface syntactic models for each element of lexical-morphological structure are applied, and all the possible constituents are built and generalized to represent all the possible variants of parsing the sentence syntactically.

Following the rough syntactic analysis, a precise syntactic analysis is performed on the graph of generalized constituents to generate one or more syntactic trees 342 to represent the source sentence. In one implementation, generating one or more syntactic trees 342 comprises choosing between lexical options and choosing between relations from the graphs. Many prior and statistical ratings may be used during the process of choosing between lexical options, and in choosing between relations from the graph. The prior and statistical ratings may also be used for assessment of parts of the generated tree and for the whole tree. In one implementation, the one or more syntactic trees may be generated or arranged in order of decreasing assessment. Thus, the best syntactic tree 346 may be generated first. Non-tree links may also be checked and generated for each syntactic tree at this time. If the first generated syntactic tree fails, for example, because of an impossibility to establish non-tree links, the second syntactic tree may be taken as the best, etc.

Many lexical, grammatical, syntactical, pragmatic, semantic features may be extracted during the steps of analysis. For example, the system can extract and store lexical information and information about belonging lexical items to semantic classes, information about grammatical forms and linear order, about syntactic relations and surface slots, using predefined forms, aspects, sentiment features such as positive-negative relations, deep slots, non-tree links, semantemes, etc. With reference to FIG. 3, this two-step syntactic analysis approach ensures that the meaning of the source sentence is accurately represented by the best syntactic structure 346 chosen from the one or more syntactic trees. Advantageously, the two-step analysis approach follows a principle of integral and purpose-driven recognition, i.e., hypotheses about the structure of a part of a sentence are verified using all available linguistic descriptions within the hypotheses about the structure of the whole sentence. This approach avoids a need to analyze numerous parsing anomalies or variants known to be invalid. In some situations, this approach reduces the computational resources required to process the sentence.

Figure 4:
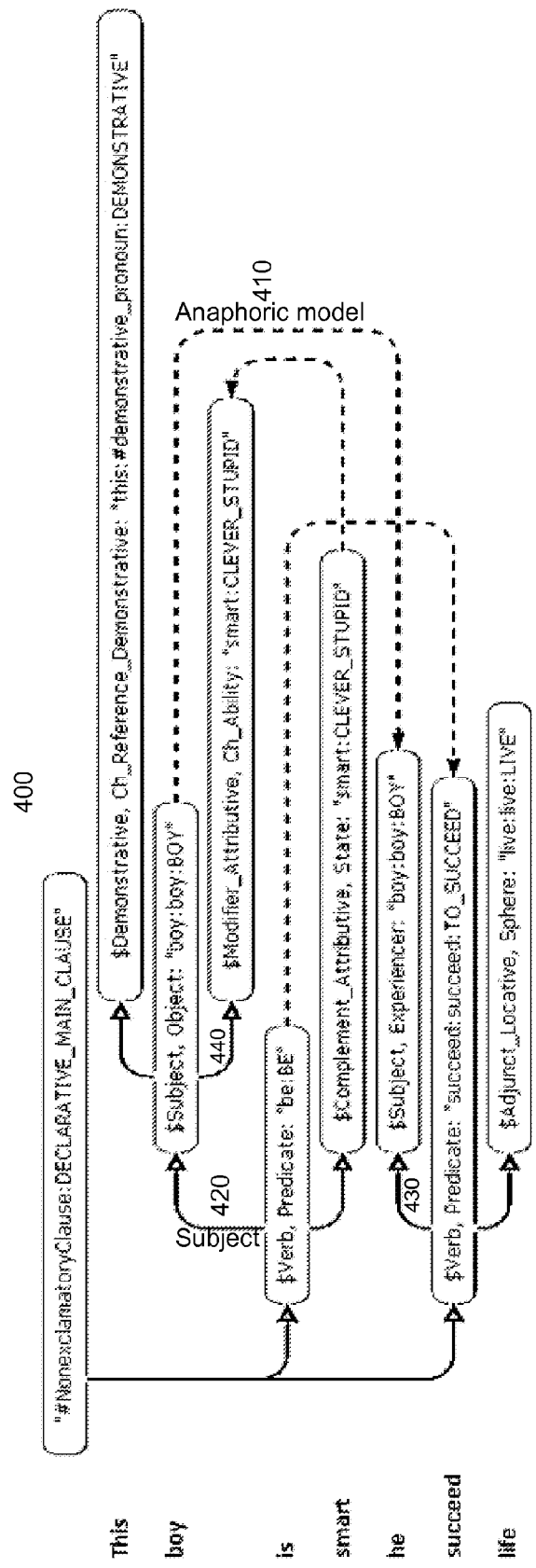
FIG. 4 shows an example of a semantic structure obtained for the exemplary sentence.
Figure 5A:
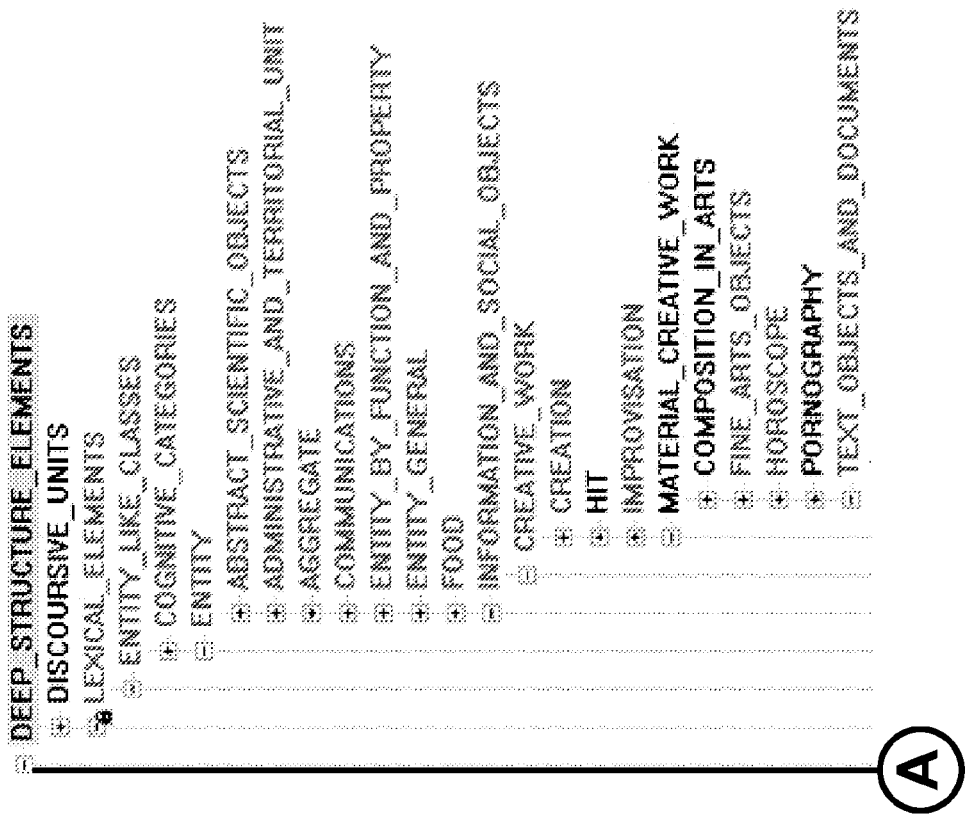
FIGS. 5A-5D illustrate fragments or portions of a semantic hierarchy.
Figure 5B:
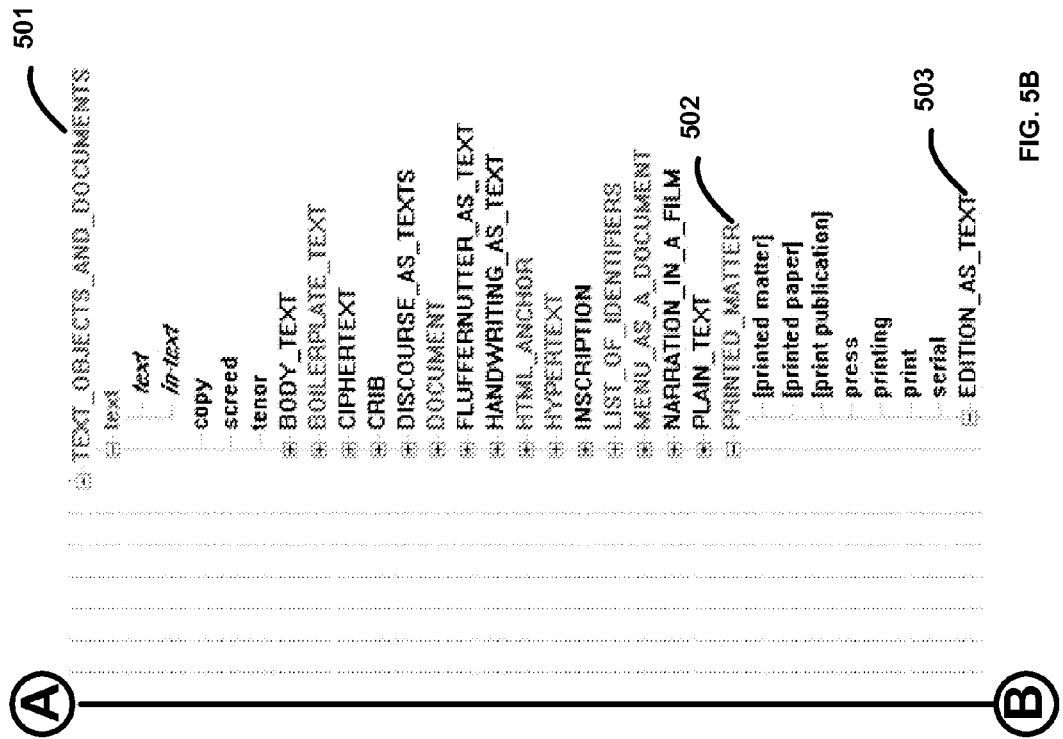
Figure 5C:
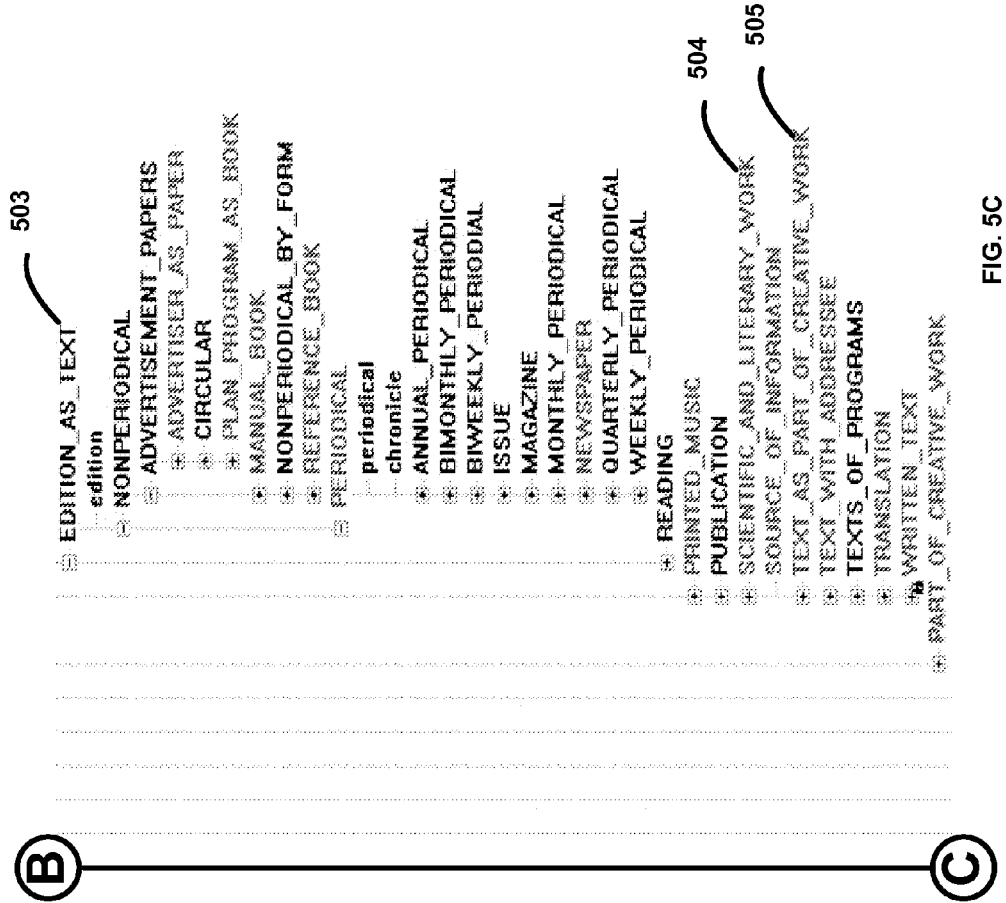
Figure 5D:
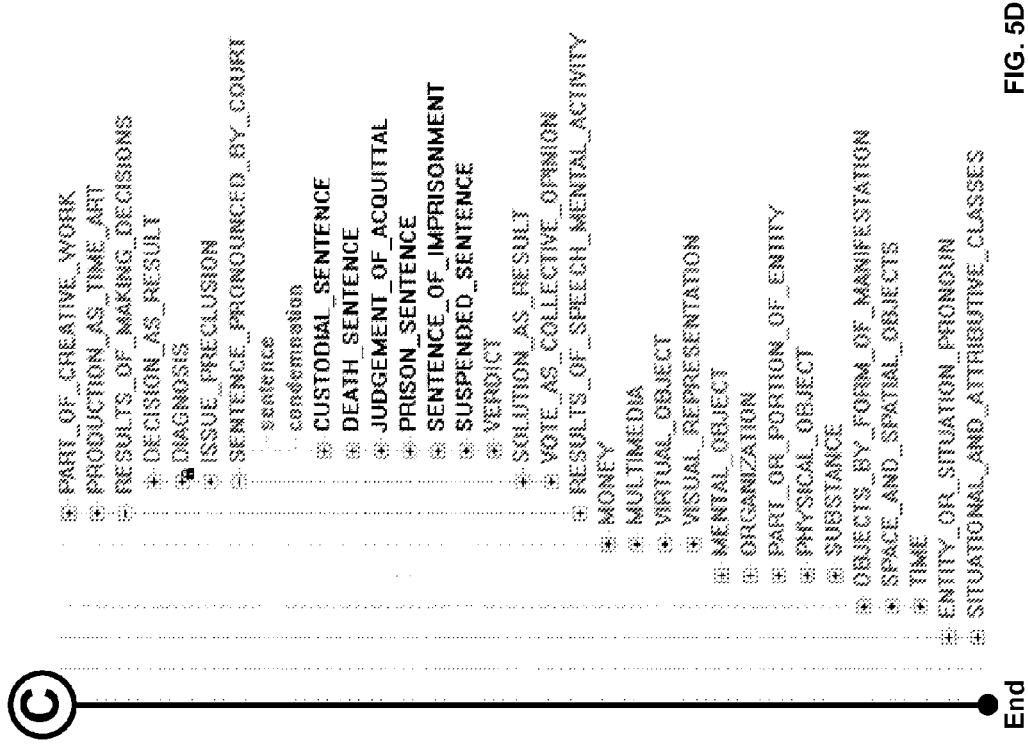

The analysis methods ensure that the maximum accuracy in conveying or understanding the meaning of the sentence is achieved. FIG. 4 shows an example of a semantic structure, obtained for the sentence "This boy is smart, he'll succeed in life." With reference to FIG. 3, this structure contains all syntactic and semantic information, such as semantic class, semantemes, semantic relations (deep slots), non-tree links, etc.

The language-independent semantic structure (LISS) 352 (constructed in block 207 in FIG. 2) of a sentence may be represented as acyclic graph (a tree supplemented with non-tree links) where each word of specific language is substituted with its universal (language-independent) semantic notions or semantic entities referred to herein as "semantic classes". Semantic class is a semantic feature that can be extracted and used for tasks of classifying, clustering and filtering text documents written in one or many languages. The other features usable for such task may be semantemes, because they may reflect not only semantic, but also syntactical, grammatical, and other language-specific features in language-independent structures.

FIG. 4 shows an example of a syntactic tree 400, obtained as a result of a precise syntactic analysis of the sentence, "This boy is smart, he'll succeed in life." This tree contains complete or substantially complete syntactic information, such as lexical meanings, parts of speech, syntactic roles, grammatical values, syntactic relations (slots), syntactic models, non-tree link types, etc. For example, "he" is found to relate to "boy" as an anaphoric model subject 410. "Boy" is found as a subject 420 of the verb "be." "He" is found to be the subject 430 of "succeed." "Smart" is found to relate to "boy" through a "control—complement" 440.

FIGS. 5A-5D illustrate fragments of a semantic hierarchy according to one embodiment. As shown, the most common notions are located in the high levels of the hierarchy. For example, as regards to types of documents, referring to FIGS. 5B and 5C, the semantic class PRINTED_MATTER (502), SCINTIFIC_AND_LITERARY_WORK (504), TEXT_AS_PART_OF_CREATIVE_WORK (505) and others are children of the semantic class TEXT_OBJECTS_AND_DOCUMENTS (501), and in turn PRINTED_MATTER (502) is a parent for semantic classes EDITION_AS_TEXT (503) which comprises classes PERIODICAL and NONPERIODICAL, where in turn PERIODICAL is a parent for ISSUE, MAGAZINE, NEWSPAPER and other classes. Various approaches may be used for dividing into classes. In some embodiments, first of all semantics of using the notions are taken into account when determining the classes, which is invariant to all languages.

Each semantic class in the semantic hierarchy may be supplied with a deep model. The deep model of the semantic class is a set of deep slots. Deep slots reflect the semantic roles of child constituents in various sentences with objects of the semantic class as the core of a parent constituent and the possible semantic classes as fillers of deep slots. The deep slots express semantic relationships between constituents, including, for example, "agent", "addressee", "instrument", "quantity", etc. A child semantic class inherits and adjusts the deep model of its direct parent semantic class.

Figure 6:
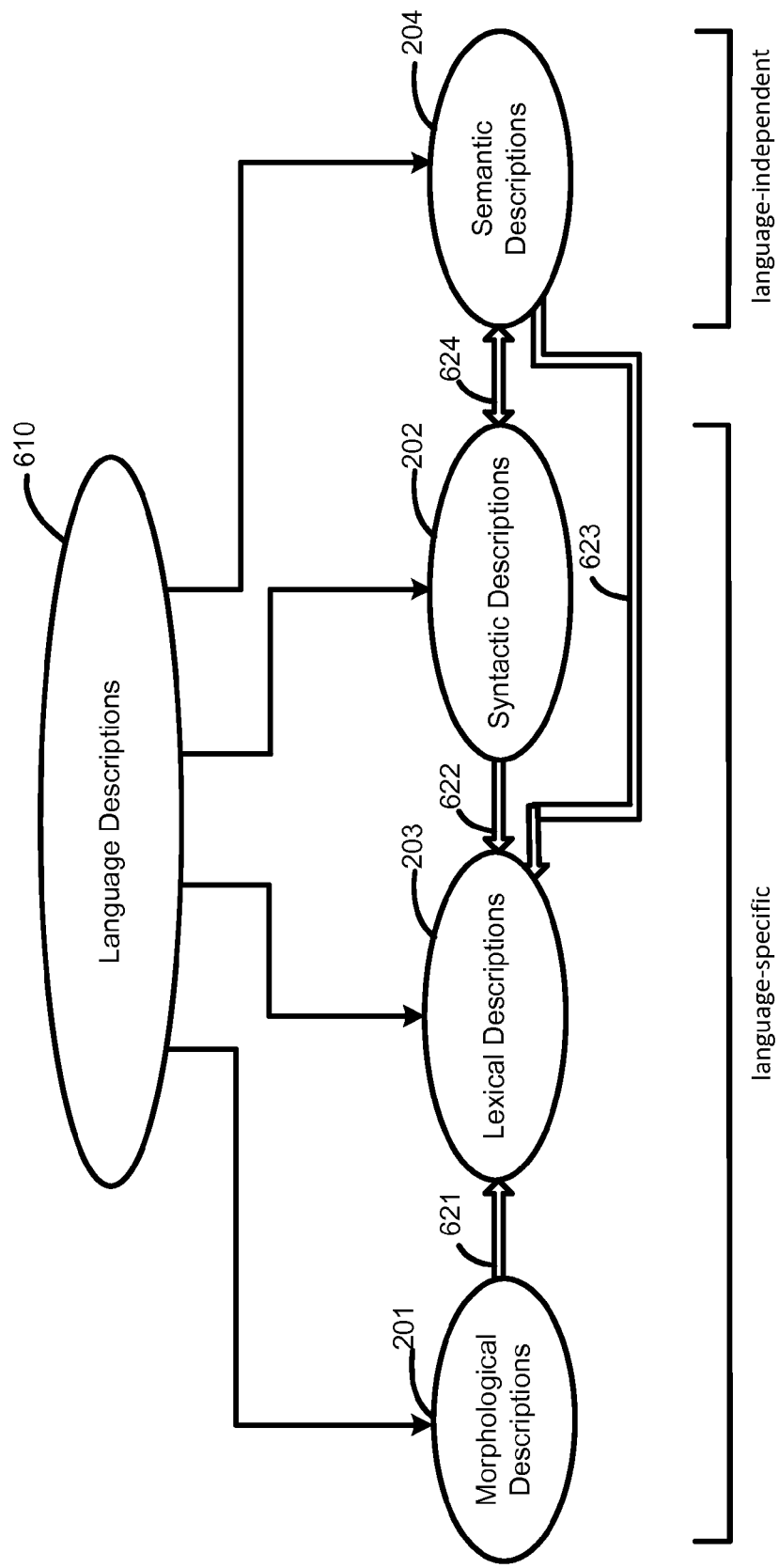
FIG. 6 is a diagram illustrating language descriptions according to one exemplary embodiment.
Figure 7:
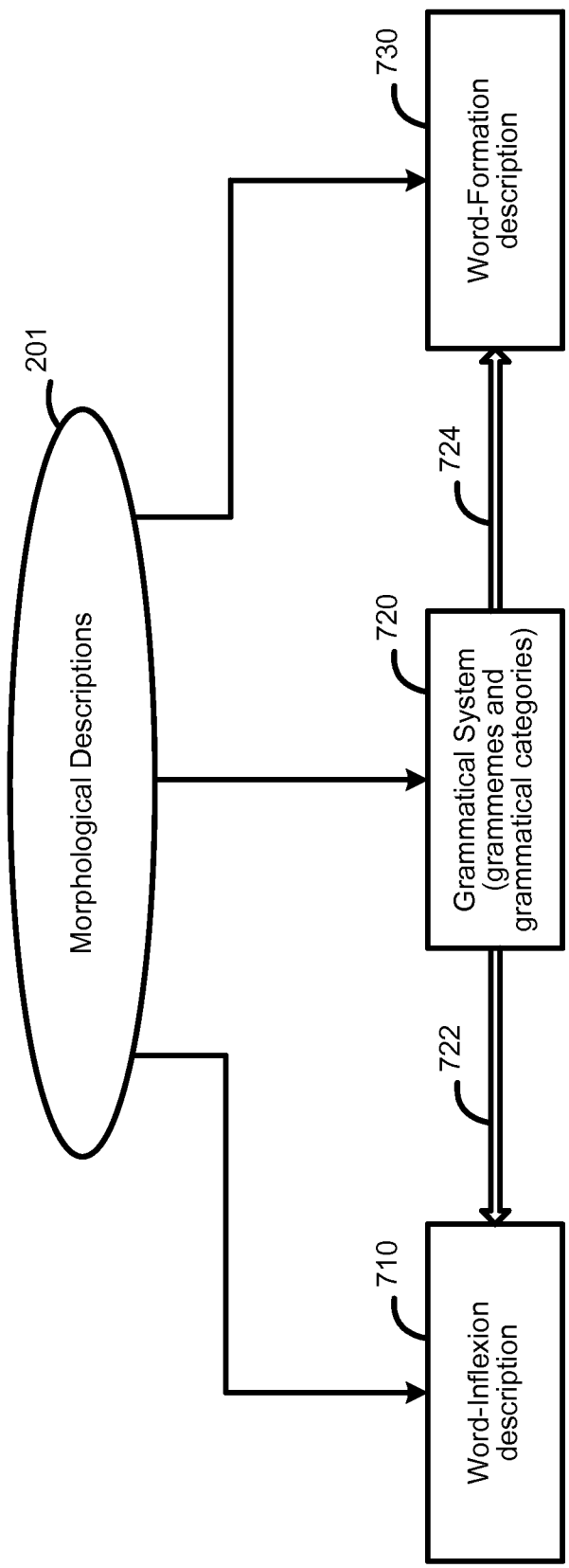
FIG. 7 is a diagram illustrating morphological descriptions according to one or more embodiments.
Figure 8:
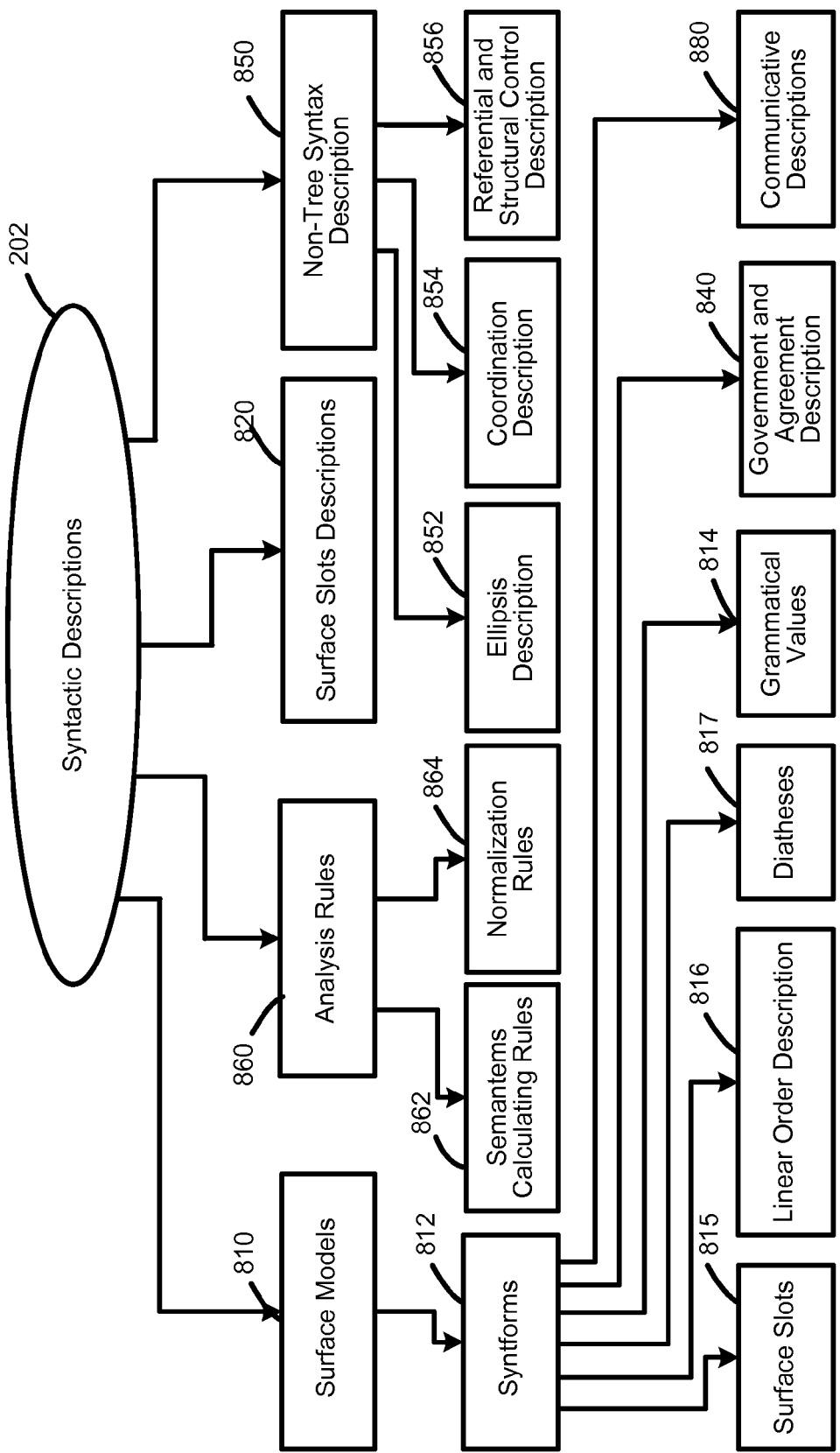
FIG. 8 is diagram illustrating syntactic descriptions according to one or more embodiments.
Figure 9:
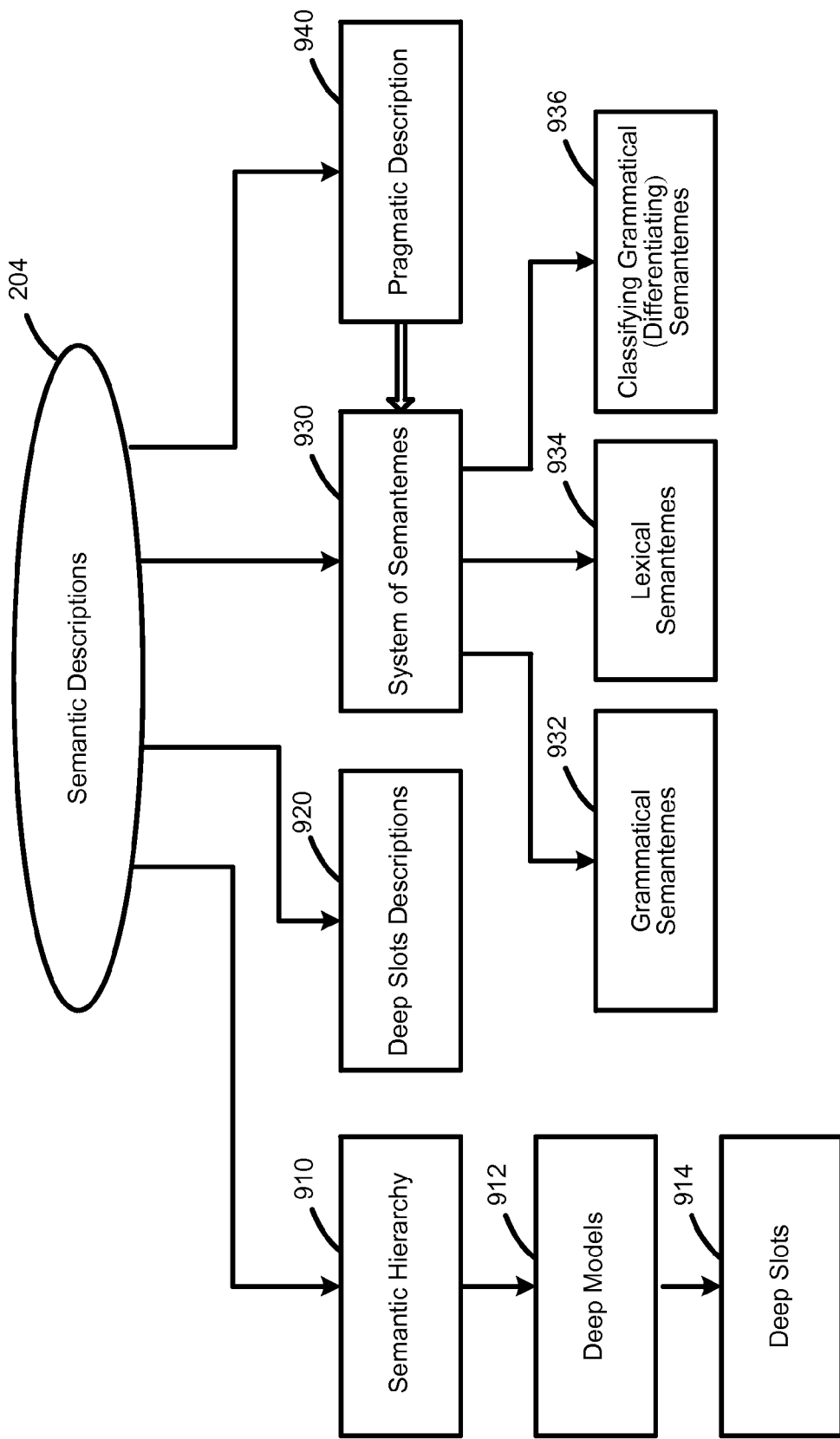
FIG. 9 is diagram illustrating semantic descriptions according to exemplary embodiment.

FIG. 6 is a diagram illustrating language descriptions 610 according to one exemplary implementation. As shown in FIG. 6, language descriptions 610 comprise morphological descriptions 201, syntactic descriptions 202, lexical descriptions 203, and semantic descriptions 204. Language descriptions 610 are joined into one common concept. FIG. 7 illustrates morphological descriptions 201, while FIG. 8 illustrates syntactic descriptions 202. FIG. 9 illustrates semantic descriptions 204.

With reference to FIG. 6 and FIG. 9, being a part of semantic descriptions 204, the semantic hierarchy 910 is a feature of the language descriptions 610, which links together language-independent semantic descriptions 204 and language-specific lexical descriptions 203 as shown by the double arrow 623, morphological descriptions 201, and syntactic descriptions 202 as shown by the double arrow 624. A semantic hierarchy may be created just once, and then may be filled for each specific language. Semantic class in a specific language includes lexical meanings with their models.

Semantic descriptions 204 are language-independent. Semantic descriptions 204 may provide descriptions of deep constituents, and may comprise a semantic hierarchy, deep slots descriptions, a system of semantemes, and pragmatic descriptions.

With reference to FIG. 6, the morphological descriptions 201, the lexical descriptions 203, the syntactic descriptions 202, and the semantic descriptions 204 may be related. A lexical meaning may have one or more surface (syntactic) models that may be provided by semantemes and pragmatic characteristics. The syntactic descriptions 202 and the semantic descriptions 204 may also be related. For example, diatheses of the syntactic descriptions 202 can be considered as an "interface" between the language-specific surface models and language-independent deep models of the semantic description 204.

FIG. 7 illustrates exemplary morphological descriptions 201. As shown, the components of the morphological descriptions 201 include, but are not limited to, word-inflexion description 710, grammatical system (e.g., grammemes) 720, and word-formation description 730. In one embodiment, grammatical system 720 includes a set of grammatical categories, such as, "Part of speech", "Case", "Gender", "Number", "Person", "Reflexivity", "Tense", "Aspect", etc. and their meanings, hereafter referred to as "grammemes". For example, part of speech grammemes may include "Adjective", "Noun", "Verb", etc.; case grammemes may include "Nominative", "Accusative", "Genitive", etc.; and gender grammemes may include "Feminine", "Masculine", "Neuter", etc.

With reference to FIG. 7, the word-inflexion description 710 may describe how the main form of a word may change according to its case, gender, number, tense, etc. and broadly includes all possible forms for a given word. The word-formation description 730 may describe which new words may be generated involving a given word. The grammemes are units of the grammatical systems 720 and, as shown by a link 722 and a link 724, the grammemes can be used to build the word-inflexion description 710 and the word-formation description 730.

FIG. 8 illustrates exemplary syntactic descriptions 202. The components of the syntactic descriptions 202 may comprise surface models 810, surface slot descriptions 820, referential and structural control descriptions 856, government and agreement descriptions 840, non-tree syntax descriptions 850, and analysis rules 860. The syntactic descriptions 202 are used to construct possible syntactic structures of a sentence from a given source language, taking into account free linear word order, non-tree syntactic phenomena (e.g., coordination, ellipsis, etc.), referential relationships, and other considerations. All these components are used during the syntactic analysis, which may be executed in accordance with the technology of exhaustive language analysis described in details in U.S. Pat. No. 8,078,450.

The surface models 810 are represented as aggregates of one or more syntactic forms ("syntforms" 812) in order to describe possible syntactic structures of sentences as included in the syntactic description 102. In general, the lexical meaning of a language is linked to their surface (syntactic) models 810, which represent constituents which are possible when the lexical meaning functions as a "core" and includes a set of surface slots of child elements, a description of the linear order, diatheses, among others.

The surface models 810 as represented by syntforms 812. Each syntform 812 may include a certain lexical meaning which functions as a "core" and may further include a set of surface slots 815 of its child constituents, a linear order description 816, diatheses 817, grammatical values 814, government and agreement descriptions 840, communicative descriptions 880, among others, in relationship to the core of the constituent.

The surface slot descriptions 820 as a part of syntactic descriptions 102 are used to describe the general properties of the surface slots 815 that are used in the surface models 810 of various lexical meanings in the source language. The surface slots 815 are used to express syntactic relationships between the constituents of the sentence. Examples of the surface slot 815 may include "subject", "object_direct", "object_indirect", "relative clause", among others.

During the syntactic analysis, the constituent model utilizes a plurality of the surface slots 815 of the child constituents and their linear order descriptions 816 and describes the grammatical values 814 of the possible fillers of these surface slots 815. The diatheses 817 represent correspondences between the surface slots 815 and deep slots 514 (as shown in FIG. 5). The diatheses 817 are represented by the link 624 between syntactic descriptions 202 and semantic descriptions 204. The communicative descriptions 880 describe communicative order in a sentence.

The syntactic forms, syntforms 812, are a set of the surface slots 815 coupled with the linear order descriptions 816. One or more constituents possible for a lexical meaning of a word form of a source sentence may be represented by surface syntactic models, such as the surface models 810. Every constituent is viewed as the realization of the constituent model by means of selecting a corresponding syntform 812. The selected syntactic forms, the syntforms 812, are sets of the surface slots 815 with a specified linear order. Every surface slot in a syntform can have grammatical and semantic restrictions on their fillers.

The linear order description 816 is represented as linear order expressions which are built to express a sequence in which various surface slots 815 can occur in the sentence. The linear order expressions may include names of variables, names of surface slots, parenthesis, grammemes, ratings, and the "or" operator, etc. For example, a linear order description for a simple sentence of "Boys play football." may be represented as "Subject Core Object_Direct", where "Subject, Object_Direct" are names of surface slots 815 corresponding to the word order. Fillers of the surface slots 815 indicated by symbols of entities of the sentence are present in the same order for the entities in the linear order expressions.

Different surface slots 815 may be in a strict and/or variable relationship in the syntform 812. For example, parenthesis may be used to build the linear order expressions and describe strict linear order relationships between different surface slots 815. SurfaceSlot1 SurfaceSlot2 or (SurfaceSlot1 SurfaceSlot2) means that both surface slots are located in the same linear order expression, but only one order of these surface slots relative to each other is possible such that SurfaceSlot2 follows after SurfaceSlot1.

As another example, square brackets may be used to build the linear order expressions and describe variable linear order relationships between different surface slots 815 of the syntform 812. As such, [SurfaceSlot1 SurfaceSlot2] indicates that both surface slots belong to the same variable of the linear order and their order relative to each other is not relevant.

The linear order expressions of the linear order description 816 may contain grammatical values 814, expressed by grammemes, to which child constituents correspond. In addition, two linear order expressions can be joined by the operator |(<<OR>>). For example: (Subject Core Object)| [Subject Core Object].

The communicative descriptions 880 describe a word order in the syntform 812 from the point of view of communicative acts to be represented as communicative order expressions, which are similar to linear order expressions. The government and agreement description 840 contains rules and restrictions on grammatical values of attached constituents which are used during syntactic analysis.

The non-tree syntax descriptions 850 are related to processing various linguistic phenomena, such as, ellipsis and coordination, and are used in syntactic structures transformations which are generated during various steps of analysis according to embodiments of the invention. The non-tree syntax descriptions 850 include ellipsis description 852, coordination description 854, as well as, referential and structural control description 830, among others.

The analysis rules 860 as a part of the syntactic descriptions 202 may include, but not limited to, semantemes calculating rules 862 and normalization rules 864. Although analysis rules 860 are used during the step of semantic analysis 150, the analysis rules 860 generally describe properties of a specific language and are related to the syntactic descriptions 102. The normalization rules 864 are generally used as transformational rules to describe transformations of semantic structures which may be different in various languages.

FIG. 9 illustrates exemplary semantic descriptions. The components of the semantic descriptions 204 are language-independent and may include, but are not limited to, a semantic hierarchy 910, deep slots descriptions 920, a system of semantemes 930, and pragmatic descriptions 940.

The semantic hierarchy 910 is comprised of semantic notions (semantic entities) and named semantic classes arranged into hierarchical parent-child relationships similar to a tree. In general, a child semantic class inherits most properties of its direct parent and all ancestral semantic classes. For example, semantic class SUBSTANCE is a child of semantic class ENTITY and the parent of semantic classes GAS, LIQUID, METAL, WOOD_MATERIAL, etc.

Each semantic class in the semantic hierarchy 910 is supplied with a deep model 912. The deep model 912 of the semantic class is a set of the deep slots 914, which reflect the semantic roles of child constituents in various sentences with objects of the semantic class as the core of a parent constituent and the possible semantic classes as fillers of deep slots. The deep slots 914 express semantic relationships, including, for example, "agent", "addressee", "instrument", "quantity", etc. A child semantic class inherits and adjusts the deep model 912 of its direct parent semantic class The deep slots descriptions 920 are used to describe the general properties of the deep slots 914 and reflect the semantic roles of child constituents in the deep models 912. The deep slots descriptions 920 also contain grammatical and semantic restrictions of the fillers of the deep slots 914. The properties and restrictions for the deep slots 914 and their possible fillers are very similar and often times identical among different languages. Thus, the deep slots 914 are language-independent.

The system of semantemes 930 represents a set of semantic categories and semantemes, which represent the meanings of the semantic categories. As an example, a semantic category, "DegreeOfComparison", can be used to describe the degree of comparison and its semantemes may be, for example, "Positive", "ComparativeHigherDegree", "SuperlativeHighestDegree", among others. As another example, a semantic category, "RelationToReferencePoint", can be used to describe an order as before or after a reference point and its semantemes may be, "Previous", "Subsequent", respectively, and the order may be spatial or temporal in a broad sense of the words being analyzed. As yet another example, a semantic category, "EvaluationObjective", can be used to describe an objective assessment, such as "Bad", "Good", etc.

The systems of semantemes 930 include language-independent semantic attributes which express not only semantic characteristics but also stylistic, pragmatic and communicative characteristics. Some semantemes can be used to express an atomic meaning which finds a regular grammatical and/or lexical expression in a language. By their purpose and usage, the system of semantemes 930 may be divided into various kinds, including, but not limited to, grammatical semantemes 932, lexical semantemes 934, and classifying grammatical (differentiating) semantemes 936.

The grammatical semantemes 932 are used to describe grammatical properties of constituents when transforming a syntactic tree into a semantic structure. The lexical semantemes 934 describe specific properties of objects (for example, "being flat" or "being liquid") and are used in the deep slot descriptions 920 as restriction for deep slot fillers (for example, for the verbs "face (with)" and "flood", respectively). The classifying grammatical (differentiating) semantemes 936 express the differentiating properties of objects within a single semantic class, for example, in the semantic class HAIRDRESSER the semanteme <<Related-ToMen>> is assigned to the lexical meaning "barber", unlike other lexical meanings which also belong to this class, such as "hairdresser", "hairstylist", etc.

The pragmatic description 940 allows the system to assign a corresponding theme, style or genre to texts and objects of the semantic hierarchy 910. For example, "Economic Policy", "Foreign Policy", "Justice", "Legislation", "Trade", "Finance", etc. Pragmatic properties can also be expressed by semantemes. For example, pragmatic context may be taken into consideration during the semantic analysis.

Figure 10:
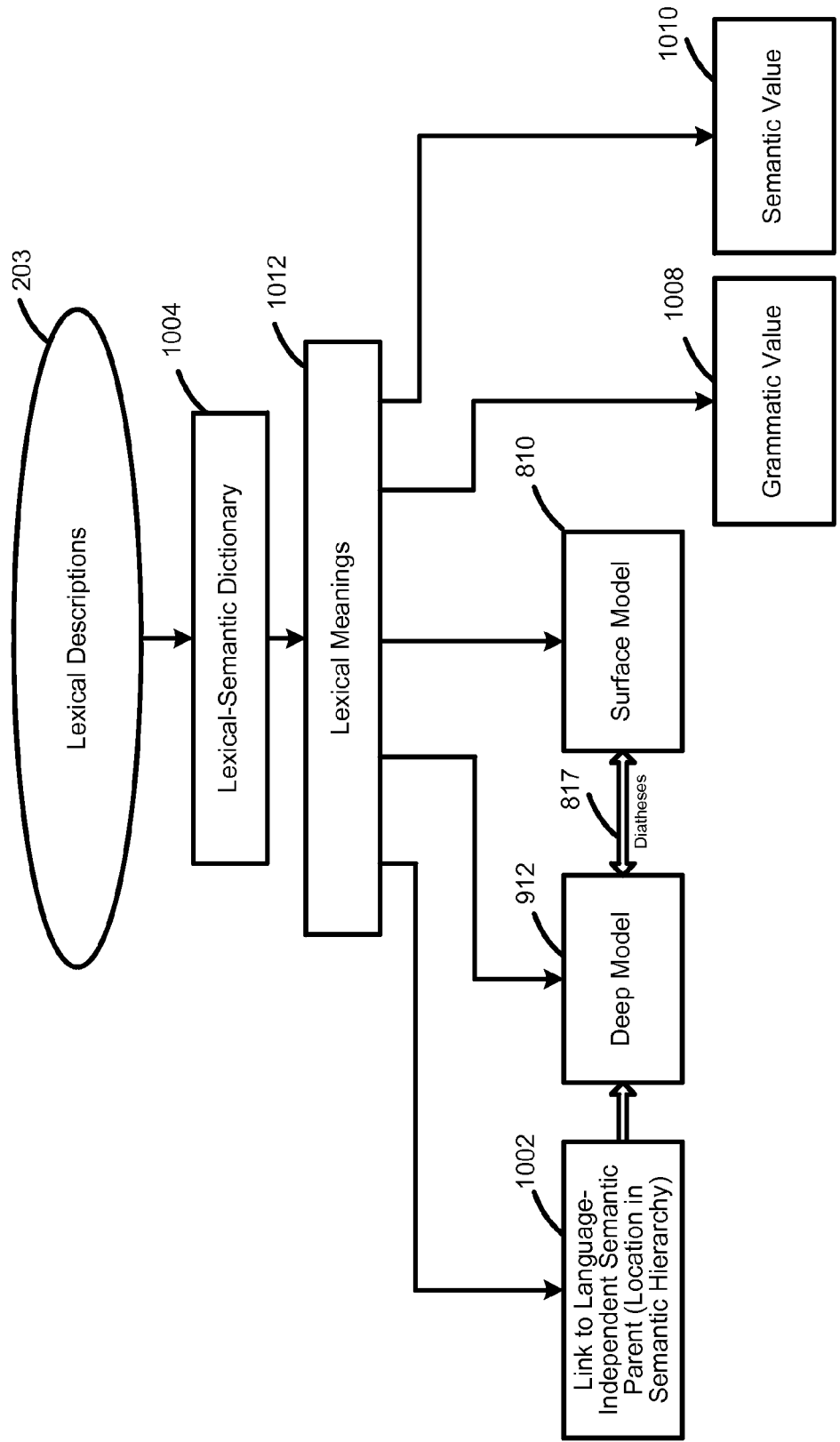
FIG. 10 is a diagram illustrating lexical descriptions according to one or more embodiments.

FIG. 10 is a diagram illustrating lexical descriptions 203 according to one exemplary implementation. As shown, the lexical descriptions 203 include a lexical-semantic dictionary 1004 that includes a set of lexical meanings 1012 arranged with their semantic classes into a semantic hierarchy, where each lexical meaning may include, but is not limited to, its deep model 912, surface model 810, grammatical value 1008 and semantic value 1010. A lexical meaning may unite different derivates (e.g., words, expressions, phrases) which express the meaning via different parts of speech or different word forms, such as, words having the same root. In turn, a semantic class unites lexical meanings of words or expressions in different languages with very close semantics.

Also, any element of the language description 610 may be extracted during an exhaustive analysis of texts, and any element may be indexed (the index for the feature are created). The indexes or indices may be stored and used for the task of classifying, clustering and filtering text documents written in one or more languages. Indexing of semantic classes is important and helpful for solving these tasks. Syntactic structures and semantic structures also may be indexed and stored for using in semantic searching, classifying, clustering and filtering.

The disclosed techniques include methods to add new concepts to semantic hierarchy. It may be needed to deal with specific terminology which is not included in the hierarchy. For example, semantic hierarchy may be used for machine translation of technical texts that include specific rare terms. In this example, it may be useful to add these terms to the hierarchy before using it in translation.

In one embodiment, the process of adding a term into the hierarchy could be manual, i.e. an advanced user may be allowed to insert the term in a particular place and optionally specify grammatical properties of the inserted term. This could be done, for example, by mentioning the parent semantic class of the term. For example, when it may be required to add a new word "Netangin" to the hierarchy, which is a medicine to treat tonsillitis, a user may specify MEDICINE as the parent semantic class. In some cases, words can be added to several semantic classes. For example, e.g. some medicines may be added to MEDICINE and as well to SUBSTANCE classes, because their names could refer to medicines or corresponding active substances.

In one embodiment, a user may be provided with a graphical user interface to facilitate the process of adding new terms. This graphical user interface may provide a user with a list of possible parent semantic classes for a new term. This provided list may either be predefined or maybe created according to a word by searching the most probable semantic classes for this new term. This searching for possible semantic classes may be done by analyzing word's structure. In one embodiment, analyzing word's structure may imply constructing character n-gram representation of words and/or computing words similarity. Character n-gram is a sequence of n characters, for example the word "Netangin" may be represented as the following set of character 2-grams (bigrams): ["Ne", "et", "ta", "an", "ng", "gi", "in"]. In another embodiment, analyzing a word's structure may include identifying words morphemes (e.g., its ending, prefixes and suffixes). For example, the "in" ending is common for medicines and Russian surnames. That's why at least the two semantic classes corresponding to these two concepts could appear in the mentioned list.

In one embodiment, the mentioned interface may allow a user to choose words similar to the one to be added. This could be done to facilitate the process of adding new concepts. Some lists of well-known instances of semantic classes could be shown to a user. In some cases, a list of concepts may represent a semantic class better than its name. For example, a user having a sentence "Petrov was born in Moscow in 1971" may not know that "ov" is a typical ending of Russian male surnames and may have doubts if "Ivanov" is a name or a surname of a person. The user may be provided with a list including "Ivanov", "Sidorov", "Bolshov" which are all surnames, and a list of personal names neither of which has the same ending, then it will be easier for a user to make the right decision.

In one embodiment, a user may be provided with a graphical user interface allowing adding new concepts directly to the hierarchy. User may see the hierarchy and be able to find through the graphical user interface places where the concepts are to be added. In another embodiment, user may be suggested to select a child node of a node of the hierarchy, starting from the root, until the correct node is found.

In one embodiment, the semantic hierarchy has a number of semantic classes that allow new concepts to be inserted. It could be either the whole hierarchy (i.e., all semantic classes it includes) or a subset of concepts. The list of updatable semantic classes may be either predefined (e.g., as the list of possible named-entity types, i.e. PERSON, ORGANIZATION etc.) or it may be generated according to the word to be added. In one embodiment, the user may be provided with a graphical user interface asking a user if the word to be added is an instance of a particular semantic class.

In one embodiment, the semantic hierarchy has a number of semantic classes that allow new concepts to be inserted. It could be either the whole hierarchy, (i.e., all semantic classes it includes), or a subset of concepts. The list of updatable semantic classes may be either predefined (e.g., as the list of possible named-entity types, i.e., PERSON, ORGANIZATION etc.) or it may be generated according to the word to be added.

Added terms may be saved in an additional file which could be then added to the semantic hierarchy by a user. In another embodiment, these terms may appear as a part of the hierarchy.

Since the semantic hierarchy may be language independent, the disclosed techniques allow to process words and texts in one or many languages.

Figure 11:
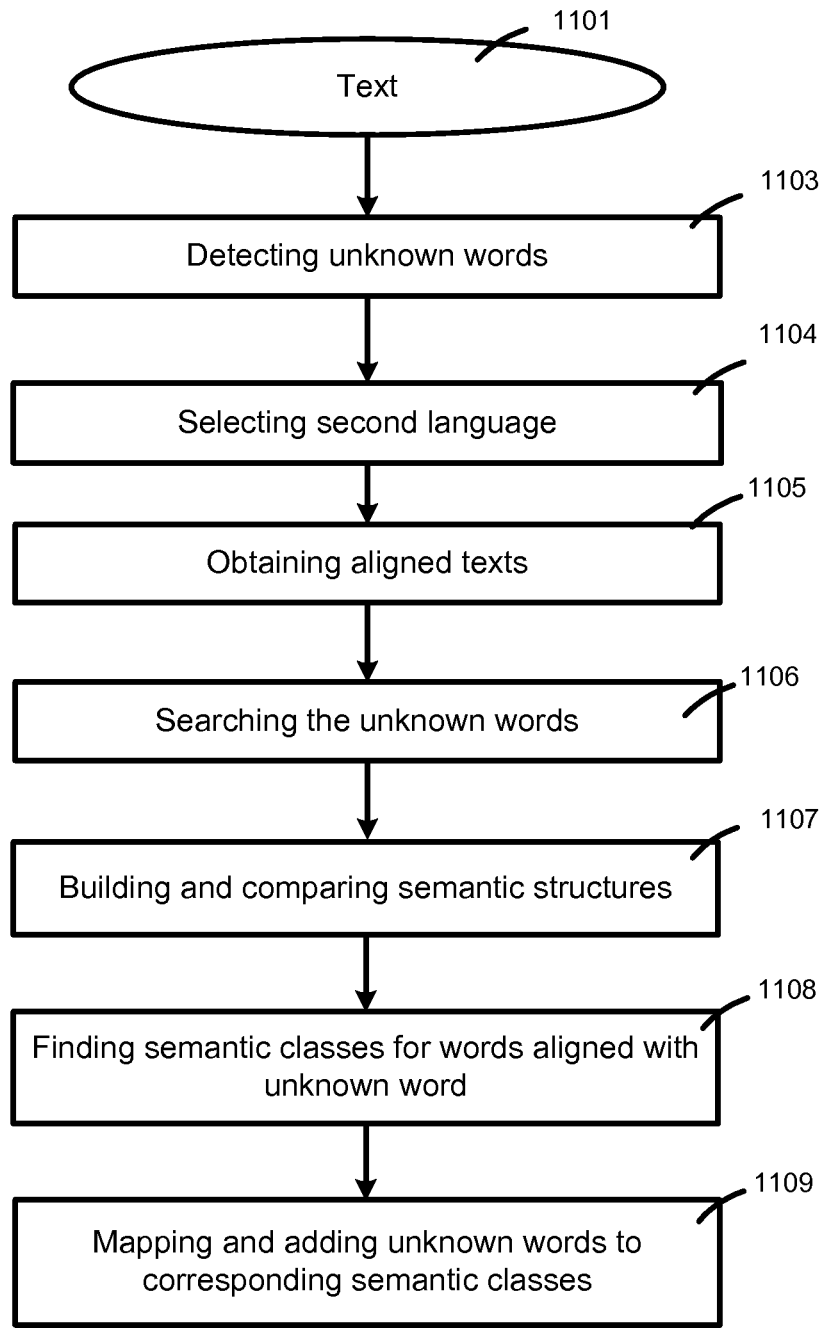
FIG. 11 is a flow diagram of a method of semantic disambiguation using parallel texts according to one or more embodiments.

FIG. 11 is a flow diagram of a method of semantic disambiguation based on parallel or comparable corpora (i.e., corpora with at least partial alignment), according to one embodiment. In one embodiment, the method includes: given a text 1101 with at least one unknown word, all unknown words (i.e., words that are not present in the sense inventory) are detected (1103). The text 1101 may be in any language, which can be analyzed by the above mentioned analyzer based on exhaustive text analysis technology, which uses linguistic descriptions described in U.S. Pat. No. 8,078,450. The analysis includes lexico-morphological, syntactic and semantic analysis. It means the system can us all necessary language-independent and language-specific linguistic descriptions according to FIG. 6,7,8,9,10 for the analysis. But the language-specific part, related to the first language, of said semantic hierarchy may be incomplete. For example, it can have lacunas in lexicon, some of lexical meanings may be omitted. Thus, some words can't be found in the semantic hierarchy, there is no lexical and syntactic model for them.

Since at least one unknown word in the first language was detected, at step 1104, a parallel corpus is selected. At least one second language different from the first language is selected (1104). The parallel corpus should be a corpus or texts it two languages with at least partial alignment. The alignment may be by sentences, that is each sentence in the first language is corresponded to a sentence of the second language. It may be, for example, Translation Memory (TM) or other resources. The aligned parallel texts may be provided by any method of alignment, for example, using a two-language dictionary, or using the method disclosed in U.S. patent application Ser. No. 13/464,447. In some embodiments, the only requirement to the second language selection may be that the second language also can be analyzed by the above mentioned analyzer based on exhaustive text analysis technology, that is all necessary language-specific linguistic descriptions according to FIG. 6,7,8,9,10 exist and can be used for the analysis.

For each second language, a pair of texts with at least partial alignment is received (1105). The said found before unknown words are searched (1106) in the first language part of the texts. For the sentences containing the unknown words and for the aligned with them sentences in the second languages, language independent semantic structures are constructed and compared (1107). The language-independent semantic structure (LISS) of a sentence is represented as acyclic graph (a tree supplemented with non-tree links) where each word of specific language is substituted with its universal (language-independent) semantic notions or semantic entities referred to herein as "semantic classes". Also, the relations between items of the sentence is marked with language-independent notions—deep slots 914. The semantic structure is built as result of the exhaustive syntactic and semantic analysis, also described in details in U.S. Pat. No. 8,078,450. So, if two sentences in two different languages have the same sense (meaning), for example, they are the result of exact and careful translation of each other, then their semantic structures must be identical or very similar.

Figure 12A:
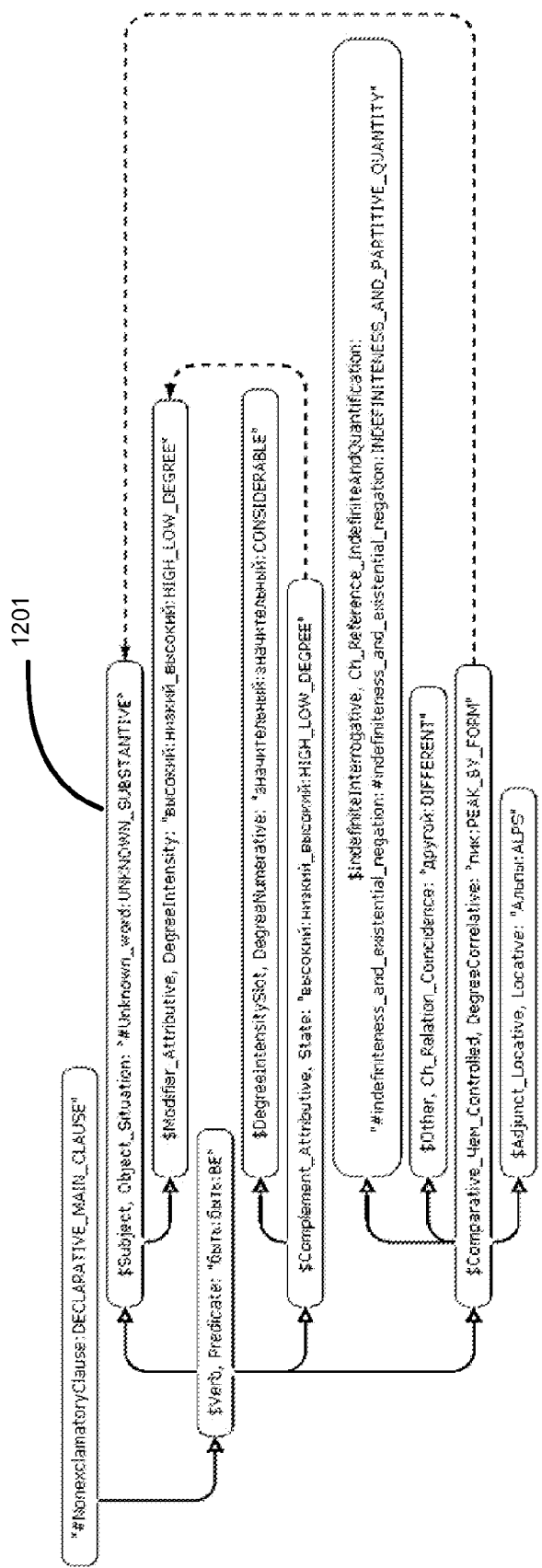
FIGS. 12A-B show semantic structures of aligned sentences according to one or more embodiments.
Figure 12B:
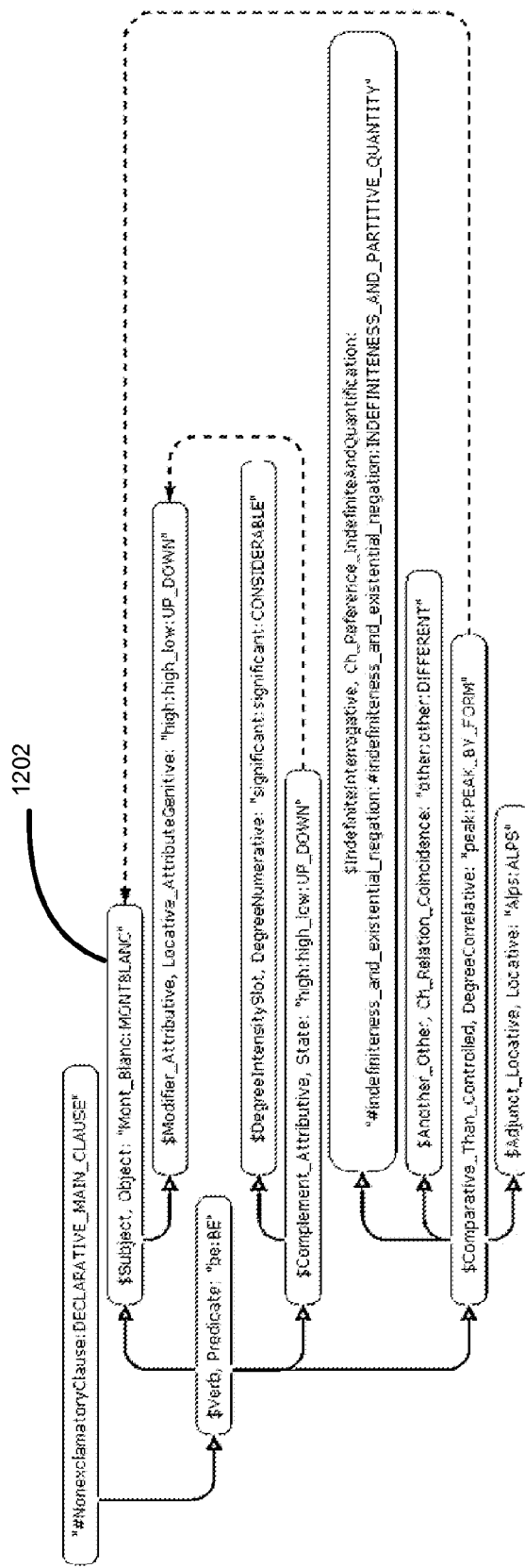

FIG. 12A-12B illustrate examples of sentences that could appear in aligned texts. FIG. 12A. illustrates a semantic structure of a Russian sentence "Монблан значительно выше, чем любой другой пик в Альпах", where the word "Монблан" was identified as unknown concept. This sentence is aligned to the English sentence: "Mont Blanc is significantly higher than any other peak in Alps". Its semantic structure is illustrates on FIG. 12B.

If the semantic structures of the found pairs of sentences are identical, that means they have the same configuration with the same semantic classes in nodes, excluding the node corresponding the unknown words, and with the same deep slots as arcs.

For each unknown word, one or more semantic classes of a word (words) aligned with it are found (1108). Referring to FIGS. 12A and 12B, since the semantic structures have the same configuration and the nodes, excluding 1201 and 1202, where the word "Монблан" in Russian part is identified on the FIG. 12A as "#Unknown_word:UNKNOWN_SUBSTANTIVE", have the same semantic classes, the nodes 1201 and 1202 are compared and mapped.

And all unknown words are mapped (1109) to the corresponding semantic classes. If such correspondence is established, it is possible to map and add the unknown word to corresponding semantic class with the semantic properties which can be extracted from corresponding lexical meaning in another language. It means that the lexical meaning "Монблан" will be added to the Russian part of the semantic hierarchy 910 into the semantic class MONTBLANC as its corresponded English lexical meaning "Mont Blanc" and it will inherit a syntactic model and other attributed of its parent semantic class MOUNTAIN.

Still referring FIG. 11, given aligned sentences 1101 in two or more languages, where all words in one sentence have corresponding lexical classes in the hierarchy, and some of the other sentences contain unknown words, the disclosed method maps unknown words to semantic classes corresponding to the words aligned with them.

FIGS. 12A-12B illustrate examples of sentences that could appear in aligned texts. FIG. 12A. illustrates a semantic structure of a Russian sentence "Монблан значительно выше, чем любой другой пик в Альпах", where the concept "Монблан" is unknown. This sentence is aligned to the English sentence: "Mont Blanc is significantly higher than any other peak in Alps". Its semantic structure is illustrated in FIG. 12B. Comparing the semantic structure of the Russian sentence on FIG. 12A with the semantic structure the English sentence on FIG. 12B, which may have the same structures, as it is shown, the conclusion about correspondence of the words "Монблан" in Russian and "Mont Blanc" in English may be made. In this case, the word aligned to the Russian "Монблан" is "Mont Blanc", and there is a semantic class in the hierarchy corresponding to this entity. Therefore the Russian word "Монблан" may be mapped to the same semantic class "MONTBLANC" and may be added as a Russian lexical class with the same semantic properties as "Mont Blanc" in English.

Figure 13:
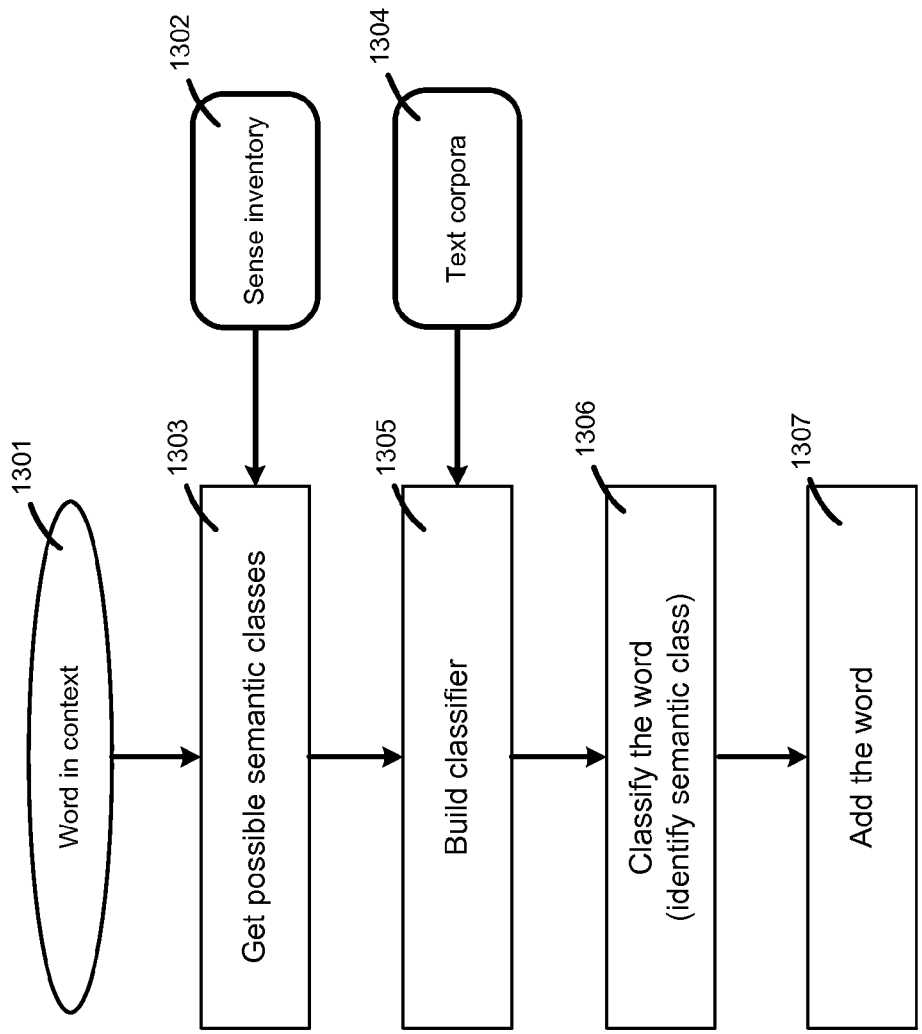
FIG. 13 is a flow diagram of a method of semantic disambiguation using classification techniques according to one or more embodiments.

FIG. 13 is a flow diagram of a method of semantic disambiguation based on machine learning techniques according to one or more embodiments. In one embodiment, semantic disambiguation may be performed as a problem of supervised learning (e.g., classification). A word in context 1301 is received. In order to determine the word's semantic class, the disclosed method first gets all possible semantic classes 1303 of a sense inventory 1302, to which the word 1301 could be assigned.

The list of the semantic classes may be predefined. For example, new concepts may be allowed only in "PERSON", "LOCATION" and "ORGANIZATION" semantic classes. In this example, these semantic classes are the categories. The list of the semantic classes may be constructed by a method, which chooses the most probable classes from all classes in the semantic hierarchy, which in turn may be done applying machine learning techniques. The classes may be ranked according to the probability that the given word is an instance of such class. The ranking may be produced with a supervised method based on corpora. Then the top-k where k may be user-defined or an optimal number found by statistical methods. These predefined or found semantic classes represent the categories, to one or many of which the word is to be assigned. Then, a classifier is built (1305) using the text corpora 1304 (e.g., Naïve Bayes classifier). The word is classified (1306) into one or more of the possible categories (i.e., semantic classes 1303). Finally, the word is added (1307) to the hierarchy as an instance of the found semantic class (classes).

In one embodiment, disambiguation may be done in the form of verifying hypothesis. First, given an unknown word all semantic classes may be ranked according to the probability of the unknown word to be an object of this semantic class. Then, the hypothesis is that the unknown word is an instance of the first ranked semantic class. This hypothesis is then checked with statistical analysis of the text corpora. It may be done with the help of indices 209. If the hypothesis is rejected, the new hypothesis that the unknown word is an instance of the second ranked semantic class, may be formulated. And so on until the hypothesis is accepted. In another embodiment, semantic class for a word may be chosen with existing word sense disambiguation techniques.

Figure 14:
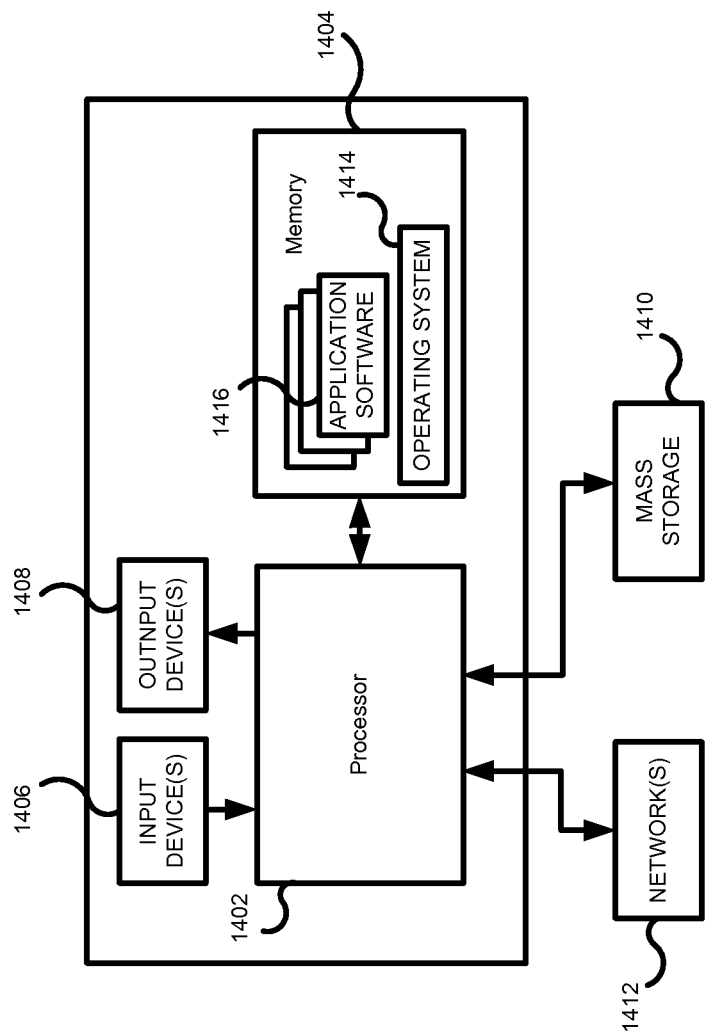
FIG. 14 shows an exemplary hardware for implementing computer system in accordance with one embodiment.

FIG. 14 shows exemplary hardware for implementing the techniques and systems described herein, in accordance with one implementation of the present disclosure. Referring to FIG. 14, the exemplary hardware 1400 includes at least one processor 1402 coupled to a memory 1404. The processor 1402 may represent one or more processors (e.g. microprocessors), and the memory 1404 may represent random access memory (RAM) devices comprising a main storage of the hardware 1400, as well as any supplemental levels of memory (e.g., cache memories, non-volatile or back-up memories such as programmable or flash memories), read-only memories, etc. In addition, the memory 1404 may be considered to include memory storage physically located elsewhere in the hardware 1400, e.g. any cache memory in the processor 1402 as well as any storage capacity used as a virtual memory, e.g., as stored on a mass storage device 1410.

The hardware 1400 may receive a number of inputs and outputs for communicating information externally. For interface with a user or operator, the hardware 1400 may include one or more user input devices 1406 (e.g., a keyboard, a mouse, imaging device, scanner, microphone) and a one or more output devices 1408 (e.g., a Liquid Crystal Display (LCD) panel, a sound playback device (speaker)). To embody the present invention, the hardware 1400 may include at least one screen device.

For additional storage, the hardware 1400 may also include one or more mass storage devices 1410, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1400 may include an interface with one or more networks 1412 (e.g., a local area network (LAN), a wide area network (WAN), a wireless network, and/or the Internet among others) to permit the communication of information with other computers coupled to the networks. It should be appreciated that the hardware 1400 typically includes suitable analog and/or digital interfaces between the processor 1402 and each of the components 1404, 1406, 1408, and 1412 as is well known in the art.

The hardware 1400 operates under the control of an operating system 1414, and executes various computer software applications, components, programs, objects, modules, etc. to implement the techniques described above. Moreover, various applications, components, programs, objects, etc., collectively indicated by application software 1416 in FIG. 14, may also execute on one or more processors in another computer coupled to the hardware 1400 via a network 1412, e.g. in a distributed computing environment, whereby the processing required to implement the functions of a computer program may be allocated to multiple computers over a network.

In general, the routines executed to implement the embodiments of the present disclosure may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that the present disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modified or re-arranged in one or more of its details as facilitated by enabling technological advancements without departing from the principals of the present disclosure.

Implementations of the subject matter and the operations described in this specification can be implemented in digital electronic circuitry, computer software, firmware or hardware, including the structures disclosed in this specification and their structural equivalents or in combinations of one or more of them. Implementations of the subject matter described in this specification can be implemented as one or more computer programs, i.e., one or more modules of computer program instructions, encoded on one or more computer storage medium for execution by, or to control the operation of data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" includes a variety of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, a code that creates an execution environment for the computer program in question, e.g., a code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well. For example, feedback provided to the user can be any form of sensory feedback, e.g., visual feedback, auditory feedback, or tactile feedback and input from the user can be received in any form, including acoustic, speech, or tactile input. In addition, a computer can interact with a user by sending documents to and receiving documents from a device that is used by the user. For example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown, in sequential order or that all illustrated operations be performed to achieve desirable results. In certain circumstances, multitasking and parallel processing may be advantageous. Moreover, the separation of various system components in the implementations described above should not be understood as requiring such separation in all implementations and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method comprising:
   receiving, by a computing device, an input natural language text including an input word;
   searching a semantic register to identify a matching word corresponding to the input word, wherein the semantic register comprises a plurality of records, each record associating a word with a concept of a semantic class;
   responsive to successfully identifying the matching word, identifying a first plurality of concepts associated with the matching word by the semantic register;
   ranking a plurality of semantic classes associated with the identified first plurality of concepts according to a probability of the input word being associated with a respective semantic class;
   selecting a pre-defined number of semantic classes having highest probabilities of the input word being associated with a respective semantic class;
   iterating through a second plurality of concepts associated, by the semantic register, with the pre-defined number of semantic classes, to identify a concept corresponding to the input word; and
   responsive to successfully identifying the concept, associating the identified concept with the input word.

2. The method of claim 1, further comprising: responsive to failing to successfully identify the matching word corresponding to the input word, adding, to the semantic registry, the input word and a corresponding concept.

3. The method of claim 1, wherein the semantic register comprises a semantic hierarchy including a plurality of semantic classes, and wherein a semantic class of the plurality of semantic classes comprises a deep model determining a semantic relationship between a parent of the semantic class and a child of the semantic class.

4. The method of claim 3, wherein the semantic class is to inherit a deep model of a parent semantic class.

5. The method of claim 1, wherein iterating through the plurality of concepts associated with the matching word is performed starting from a root of a semantic hierarchy associated with the semantic register.

6. The method of claim 1, wherein the semantic registry is associated with a semantic hierarchy comprising a plurality of semantic structures, wherein a semantic structure of the plurality of semantic structures comprises a plurality of semantic classes, wherein a semantic class of the plurality of semantic classes comprises a plurality of words representing a plurality of instances of the semantic classes, and wherein an instance of the plurality of instances is associated with one or more semantic concepts.

7. The method of claim 1, wherein identifying the concept corresponding to the input word further comprises:
identifying, in a parallel natural language text corresponding to the input natural language text, a parallel word corresponding to the input word; and
comparing a first context associated the input word to a second context associated with the parallel word in the parallel natural language text.

8. The method of claim 1, wherein identifying the concept corresponding to the input word further comprises:
evaluating a classification function to produce a degree of association of a semantic class instance with the input word.

9. A system comprising:
a storage device; and
a processor operatively coupled to the storage device, the processor to:
receive an input natural language text including an input word;
search a semantic register to identify a matching word corresponding to the input word, wherein the semantic register comprises a plurality of records, each record associating a word with a concept of a semantic class;
responsive to successfully identifying the matching word, identify a first plurality of concepts associated with the matching word by the semantic register;
rank a plurality of semantic classes associated with the identified first plurality of concepts according to a probability of the input word being associated with a respective semantic class;
select a pre-defined number of semantic classes having highest probabilities of the input word being associated with a respective semantic class;
iterate through a second plurality of concepts associated, by the semantic register, with the pre-defined number of semantic classes, to identify a concept corresponding to the input word; and
responsive to successfully identifying the concept, associate the identified concept with the input word.

10. The system of claim 9, wherein the processor is further to: responsive to failing to successfully identify the matching word corresponding to the input word inventory, adding a add, to the semantic registry, the input word and a corresponding concept.

11. The system of claim 9, wherein the semantic register comprises a semantic hierarchy including a plurality of semantic classes, and wherein a semantic class of the plurality of semantic classes comprises a deep model determining a semantic relationship between a parent of the semantic class and a child of the semantic class.

12. The system of claim 11, wherein the semantic class is to inherit a deep model of a parent semantic class.

13. The system of claim 9, wherein iterating through the plurality of concepts associated with the matching word is performed starting from a root of a semantic hierarchy associated with the semantic register.

14. The system of claim 9, wherein the semantic registry is associated with a semantic hierarchy comprising a plurality of semantic structures, wherein a semantic structure of the plurality of semantic structures comprises a plurality of semantic classes, wherein a semantic class of the plurality of semantic classes comprises a plurality of words representing a plurality of instances of the semantic classes, and wherein an instance of the plurality of instances is associated with one or more semantic concepts.

15. A computer-readable non-transitory storage medium comprising executable instructions to cause a processor to:
receive an input natural language text including an input word;
search a semantic register to identify a matching word corresponding to the input word, wherein the semantic register comprises a plurality of records, each record associating a word with a concept of a semantic class;
responsive to successfully identifying the matching word, identify a first plurality of concepts associated with the matching word by the semantic register;
ranking a plurality of semantic classes associated with the identified first plurality of concepts according to a probability of the input word being associated with a respective semantic class;
selecting a pre-defined number of semantic classes having highest probabilities of the input word being associated with a respective semantic class;
iterating through a second plurality of concepts associated, by the semantic register, with the identified plurality identified plurality of semantic classes, to identify a concept corresponding to the input word; and
responsive to successfully identifying the concept, associate the identified concept with the input word.

16. The computer-readable non-transitory storage medium of claim 15, further comprising executable instructions to cause the processor to:
responsive to failing to successfully identify the matching word corresponding to the input word add, to the semantic registry, the input word and a corresponding concept.

17. The computer-readable non-transitory storage medium of claim 15, wherein the semantic register comprises a semantic hierarchy including a plurality of semantic classes, and wherein a semantic class of the plurality of semantic classes comprises a deep model determining a semantic relationship between a parent of the semantic class and a child of the semantic class.

18. The computer-readable non-transitory storage medium of claim 17, wherein the semantic class is to inherit a deep model of a parent semantic class.

19. The computer-readable non-transitory storage medium of claim 15, wherein iterating through the plurality of concepts associated with the matching word is performed starting from a root of a semantic hierarchy associated with the semantic register.

20. The computer-readable non-transitory storage medium of claim 15, wherein the semantic registry is associated with a semantic hierarchy comprising a plurality of semantic structures, wherein a semantic structure of the plurality of semantic structures comprises a plurality of semantic classes, wherein a semantic class of the plurality of semantic classes comprises a plurality of words representing a plurality of instances of the semantic classes, and wherein an instance of the plurality of instances is associated with one or more semantic concepts.

* * * * *